(12) United States Patent
Neville et al.

(10) Patent No.: US 12,240,122 B2
(45) Date of Patent: Mar. 4, 2025

(54) PALLETIZING BOXES

(71) Applicant: Boston Dynamics, Inc., Waltham, MA (US)

(72) Inventors: Neil Neville, Waltham, MA (US); Kevin Blankespoor, Arlington, MA (US); Jennifer Barry, Cambridge, MA (US); Alexander Douglas Perkins, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 50 days.

(21) Appl. No.: 18/349,511

(22) Filed: Jul. 10, 2023

(65) Prior Publication Data
US 2023/0347513 A1 Nov. 2, 2023

Related U.S. Application Data

(63) Continuation of application No. 17/812,825, filed on Jul. 15, 2022, now Pat. No. 11,738,456, which is a
(Continued)

(51) Int. Cl.
| | |
|---|---|
| B25J 9/16 | (2006.01) |
| B25J 5/00 | (2006.01) |
| B25J 9/00 | (2006.01) |
| B25J 15/00 | (2006.01) |
| B25J 15/06 | (2006.01) |
| B65G 57/24 | (2006.01) |

(52) U.S. Cl.
CPC .............. *B25J 9/1661* (2013.01); *B25J 5/007* (2013.01); *B25J 9/0096* (2013.01); *B25J 9/1612* (2013.01);
(Continued)

(58) Field of Classification Search
CPC ........ B25J 5/007; B25J 9/0096; B25J 9/1612; B25J 9/162; B25J 9/1661; B25J 9/1697; B25J 15/0616; B65G 57/24
See application file for complete search history.

(56) References Cited

U.S. PATENT DOCUMENTS

| | | |
|---|---|---|
| 7,719,222 B2 | 5/2010 | Theobald |
| 9,089,969 B1 | 7/2015 | Theobald |

(Continued)

FOREIGN PATENT DOCUMENTS

| | | |
|---|---|---|
| DE | 2724978 A1 | 12/1978 |
| JP | S61-152389 A | 7/1986 |

(Continued)

OTHER PUBLICATIONS

International Search Report and Written Opinion mailed on Jul. 28, 2020, issued for International Patent Application No. PCT/US2020/022360, 14 pages.

(Continued)

*Primary Examiner* — Dale Moyer
(74) *Attorney, Agent, or Firm* — PIERCE ATWOOD LLP

(57) ABSTRACT

A method for palletizing by a robot includes positioning an object at an initial position adjacent to a target object location, tilting the object at an angle relative to a ground plane, shifting the object in a first direction from the initial position toward a first alignment position, shifting the object in a second direction from the first alignment position toward a second alignment position, and releasing the object from the robot to pivot the object toward the target object location.

20 Claims, 10 Drawing Sheets

Related U.S. Application Data continuation of application No. 16/816,927, filed on Mar. 12, 2020, now Pat. No. 11,407,107.

(60) Provisional application No. 62/824,434, filed on Mar. 27, 2019.

(52) U.S. Cl.
CPC ............ B25J 9/162 (2013.01); B25J 9/1697 (2013.01); B25J 15/0616 (2013.01); B65G 57/24 (2013.01)

(56) References Cited

U.S. PATENT DOCUMENTS

| | | | |
|---|---|---|---|
| 11,127,971 | B2 | 9/2021 | Turner |
| 11,407,107 | B2 | 8/2022 | Neville et al. |
| 2007/0280812 | A1* | 12/2007 | Morency .............. B65G 61/00 414/729 |
| 2020/0091542 | A1* | 3/2020 | Turner .............. H01M 10/0404 |
| 2021/0019452 | A1* | 1/2021 | Theobald ........... G05B 19/4189 |

FOREIGN PATENT DOCUMENTS

| | | |
|---|---|---|
| JP | H08-198452 A | 8/1996 |
| JP | 2007-280408 A | 10/2007 |
| JP | 5112115 B2 | 1/2013 |
| JP | 2013-052925 A | 3/2013 |
| WO | 2014076837 A1 | 5/2014 |
| WO | 2015153697 A1 | 10/2015 |

OTHER PUBLICATIONS

Japanese Office Action with translation issued for Japanese Patent Application No. 2021-552962 mailed Jan. 13, 2023, 11 pages.

* cited by examiner

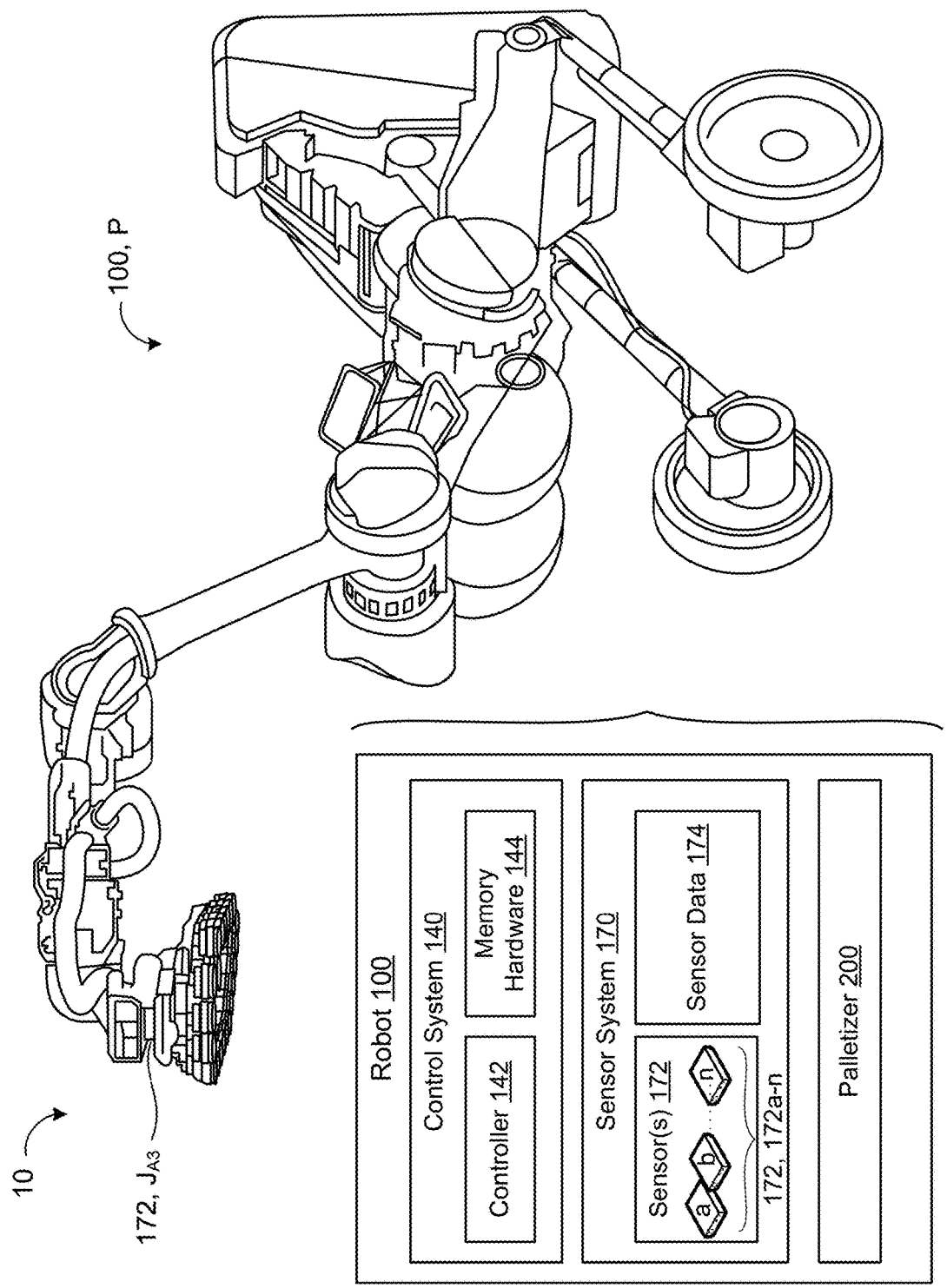

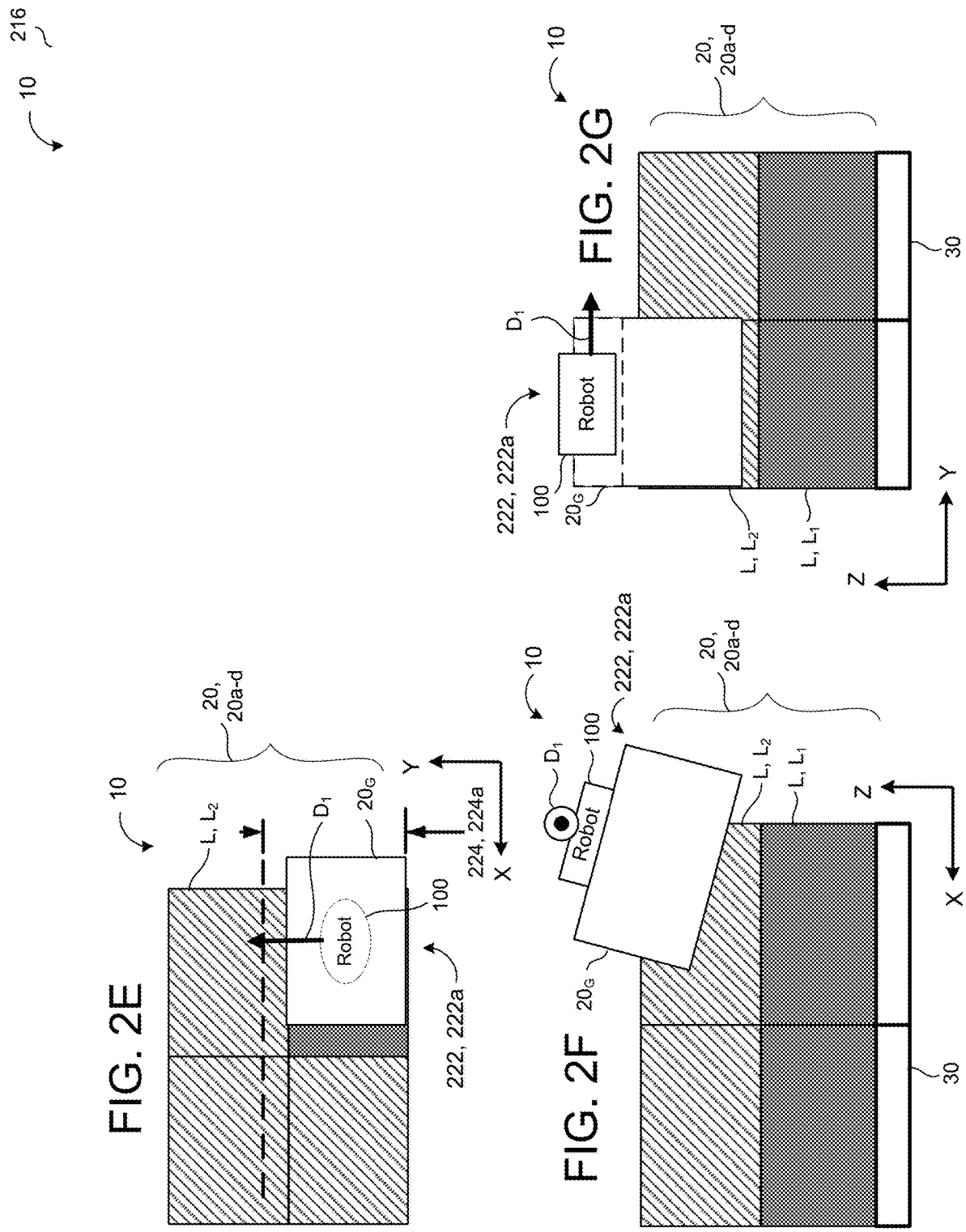

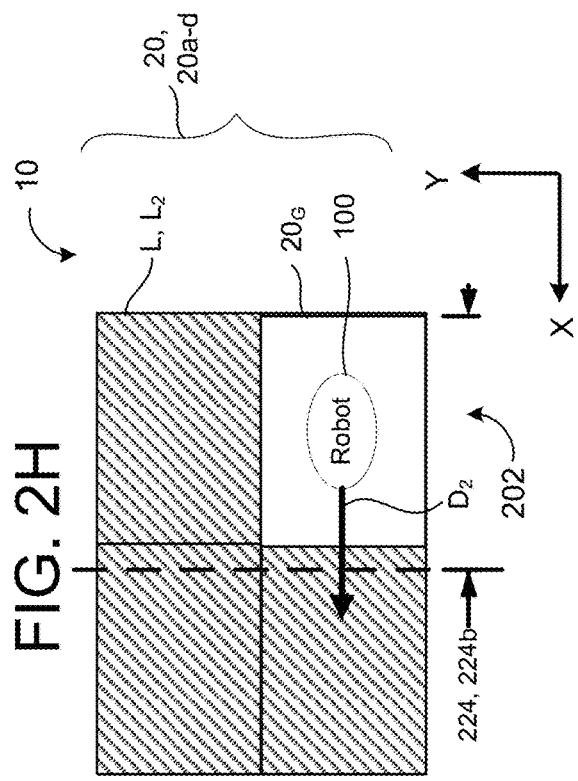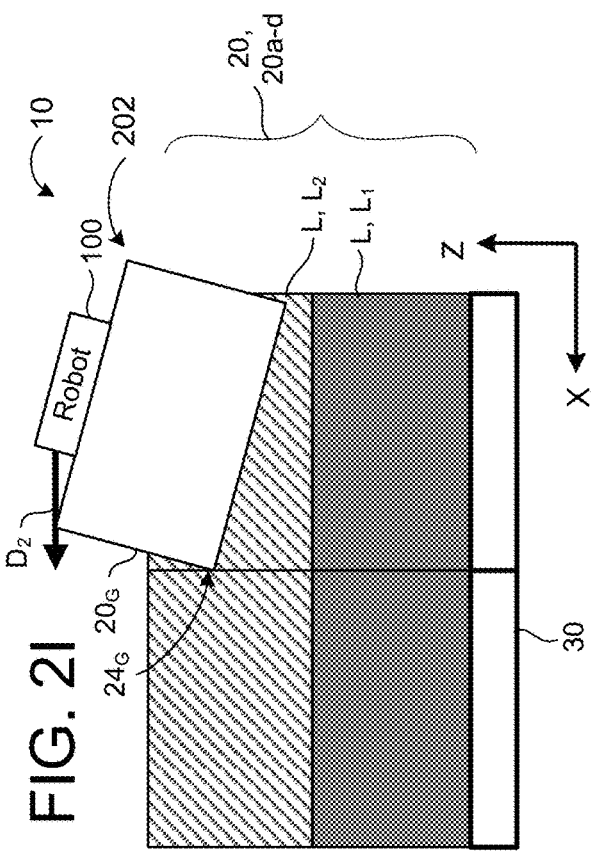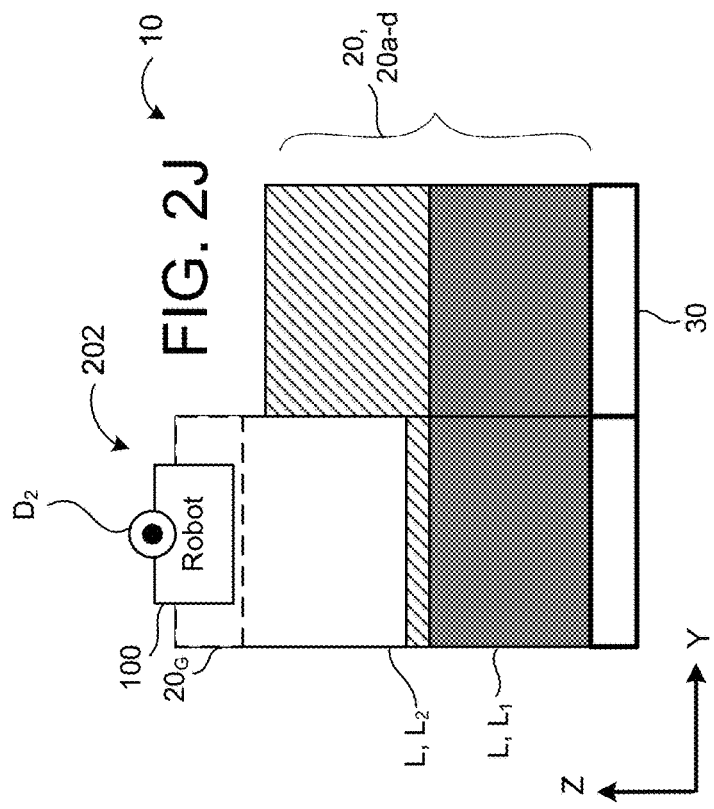

PALLETIZING BOXES

CROSS REFERENCE TO RELATED APPLICATIONS

This application is a continuation of U.S. patent application Ser. No. 17/812,825, filed Jul. 15, 2022, and titled "PALLETIZING BOXES," which is a continuation of U.S. patent application Ser. No. 16/816,927, filed Mar. 12, 2020, and titled "PALLETIZING BOXES," now U.S. Pat. No. 11,407,107, which claims the benefit of priority under 35 U.S.C. § 119 of U.S. Provisional Patent Application No. 62/824,434, filed on Mar. 27, 2019, and titled "PALLETIZING BOXES," each of which is herein incorporated by reference in its entirety.

TECHNICAL FIELD

This disclosure relates to palletizing boxes.

BACKGROUND

A robot is generally defined as a reprogrammable and a multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. Each of these industries includes or relies on some degree of logistics and/or interaction with package goods. As such, the ability to palletize boxes may enhance a robot's functionality and provide additional benefits to these industries.

SUMMARY

One aspect of the disclosure provides a method for palletizing boxes. The method includes receiving, at data processing hardware of a robot, a target box location for a box held by the robot. The box has a top surface, a bottom surface, and side surfaces. The method also includes positioning, by the robot, the box at an initial position adjacent to the target box location and tilting, by the robot, the box at an angle relative to a ground plane, the angle formed between the ground plane and the bottom surface of the box. The method further includes shifting, by the robot, the box from the initial position in a first direction to a first alignment position that satisfies a threshold first alignment distance and shifting, by the robot, the box from the first alignment position in a second direction to the target box location that satisfies a threshold second alignment distance. The method also includes releasing, by the robot, the box from the robot, the release of the box causing the box to pivot toward a boundary edge of the target box location.

Implementations of the disclosure may include one or more of the following optional features. In some implementations, the initial position includes an offset from the target box location in the first direction and the second direction. Here, the method may include receiving, at the data processing hardware, sensor data from a vision system of the robot and determining, by the data processing hardware, a first compensation distance in the first direction and a second compensation distance in the second direction, the first compensation distance and the second compensation distance compensating for a difference between an actual position of the box and a perceived position of the box based on the sensor data. When receiving sensor data from the vision system, the initial position includes a first offset from the target box location in the first direction based on the first compensation distance and a second offset from the target box location in the second direction based on the second compensation distance.

In some examples, shifting the box from the initial position in the first direction to the first alignment position includes, prior to satisfying the first alignment distance, determining that the box experiences a threshold contact force or a threshold velocity and shifting the box from the first alignment position in the second direction to the target box location includes, prior to satisfying the threshold second alignment distance, determining that the box experiences the threshold contact force or the threshold velocity. Prior to satisfying the threshold first alignment distance or the threshold second alignment distance, the method may include determining that the box has moved in the corresponding one of the first direction or the second direction for a threshold period.

In some configurations, positioning the box at the initial position includes holding the box above the target box location without contacting an adjacent box. Releasing the box from the robot may cause the box to abut against one or more adjacent boxes. The target box location may be located on a pallet configured to support a plurality of boxes. The robot may include a manipulator arm with an end-effector configured to grasp the box. Here, the end-effector may include a plurality of suction cups configured to apply a suction force to grasp the box.

In some implementations, the robot includes an inverted pendulum body having a first end portion, a second end portion, and a plurality of joints; an arm coupled to the inverted pendulum body at a first joint of the plurality of joints, the arm including an end-effector configured to grasp the box; at least one leg having first and second ends, the first end coupled to the inverted pendulum body at a second joint of the plurality of joints; and a drive wheel rotatably coupled to the second end of the at least one leg, the drive wheel configured to move the robot according to rolling contact with the ground plane. The at least one leg may include a right leg having first and second ends, the first end of the right leg prismatically coupled to the second end portion of the inverted pendulum body, the right leg having a right drive wheel rotatably coupled to the second end of the right leg The at least one leg may also include a left leg having first and second ends, the first end of the left leg prismatically coupled to the second end portion of the inverted pendulum body, the left leg having a left drive wheel rotatably coupled to the second end of the left leg. The robot may include a counter-balance body disposed on the inverted pendulum body and configured to move relative to the inverted pendulum body.

Another aspect of the disclosure provides a robot for palletizing boxes. The robot includes a body having one or more joints and an arm coupled to the body at a first joint of the one or more joints, the arm including an end-effector. The robot also includes data processing hardware and memory hardware in communication with the data processing hardware. The memory hardware stores instructions that when executed on the data processing hardware cause the data processing hardware to perform operations. The operations include receiving a target box location for a box grasped by the end-effector, the box having a top surface, a bottom surface, and side surfaces. The operations also include instructing the robot to position the box at an initial position adjacent to the target box location and instructing the robot to tilt the box at an angle relative to a ground plane, the angle formed between the ground plane and the bottom surface of the box. The operations further include instructing the robot to shift the box from the initial position in a first direction to a first alignment position that satisfies a threshold first alignment distance, instructing the robot to shift the box from the first alignment position in a second direction to the target box location that satisfies a threshold second alignment distance, and instructing the robot to release the box from the end-effector, the release of the box causing the box to pivot toward a boundary edge of the target box location.

This aspect may include one or more of the following optional features. In some examples, the second direction is perpendicular to the first direction. The initial position may include an offset from the target box location in the first direction and the second direction. The operations may include receiving sensor data from a vision system of the robot and determining a first compensation distance in the first direction and a second compensation distance in the second direction, the first compensation distance and the second compensation distance compensating for a difference between an actual position of the box and a perceived position of the box based on the sensor data. Here, the initial position includes a first offset from the target box location in the first direction based on the first compensation distance and a second offset from the target box location in the second direction based on the second compensation distance.

In some configurations, shifting the box from the initial position in the first direction to the first alignment position includes, prior to satisfying the first alignment distance, determining that the box experiences a threshold contact force or a threshold velocity and shifting the box from the first alignment position in the second direction to the target box location includes, prior to satisfying the threshold second alignment distance, determining that the box experiences the threshold contact force or the threshold velocity. Prior to satisfying the threshold first alignment distance or the threshold second alignment distance, the operations include determining that the box has moved in the corresponding one of the first direction or the second direction for a threshold period.

In some implementations, positioning the box at the initial position includes holding the box above the target box location without contacting an adjacent box. Releasing the box from the robot may cause the box to abut against one or more adjacent boxes. The target box location may be located on a pallet configured to support a plurality of boxes. The end-effector may include a plurality of suction cups configured to apply a suction force to grasp the box.

In some examples, the robot includes at least one leg having first and second ends, the first end coupled to the body at a second joint of the plurality of joints, and a drive wheel rotatably coupled to the second end of the at least one leg, the drive wheel configured to move the robot according to rolling contact with the ground plane. The at least one leg includes a right leg having first and second ends and a left leg having first and second ends. The first end of the right leg is prismatically coupled to the body, the right leg having a right drive wheel rotatably coupled to the second end of the right leg. The first end of the left leg is prismatically coupled to the body, the left leg having a left drive wheel rotatably coupled to the second end of the left leg.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1C is a schematic view of an example arrangement of systems of the robot of FIG. 1B.

FIG. 2E is a top view of an example of the robot of FIG. 1A moving the grasped box in a first direction with respect to a stack of boxes on a pallet.

FIG. 2F is a front view of an example of the robot of FIG. 1A moving the grasped box in a first direction with respect to a stack of boxes on a pallet.

FIG. 2G is a side view of an example of the robot of FIG. 1A moving the grasped box in a first direction with respect to a stack of boxes on a pallet.

FIG. 2H is a top view of an example of the robot of FIG. 1A moving the grasped box in a second direction with respect to a stack of boxes on a pallet.

FIG. 2I is a front view of an example of the robot of FIG. 1A moving the grasped box in a second direction with respect to a stack of boxes on a pallet.

FIG. 2J is a side view of an example of the robot of FIG. 1A moving the grasped box in a second direction with respect to a stack of boxes on a pallet.

Like reference symbols in the various drawings indicate like elements.

DETAILED DESCRIPTION

Logistics has evolved to package and/or to ship goods of all shapes and sizes. With this evolution, more and more packaged goods, such as boxes, move about various logistic channels. In particular, in recent decades, consumer demand for packaged goods has significantly increased due to, among other things, an increase in online shopping. Today, large shipping companies estimate shipping several millions of packages every day. As part of shipping logistics, it is often necessary to perform certain tasks related to boxes, such as counting, sorting, transporting, palletizing, etc. These tasks may be needed at both incoming and/or outgoing facilities for various businesses, warehouses, fulfillment centers, etc. Currently, the tasks related to boxes of packaged goods use countless amounts of human labor and time. Furthermore, while speed and accuracy may be critical, these tasks are often monotonous, tedious, time-consuming, and/or strenuous.

Due to the inherent nature of human fatigue and its detrimental impact on human accuracy, these tasks are generally better suited for a robot. A robot may perform box-related tasks in a repeatable and/or reliable manner without suffering from fatigue. Advantageously, some aspects of shipping logistics already involve machinery and/or machine processing. For instance, shipping environments typically include equipment such as computers, scanners, scales, conveyors, or forklifts. By using a robot to perform tasks for boxes, the robot may function to consolidate the roles of this equipment. In some cases, a robot may more easily integrate with this equipment and/or related logistic systems. Based on these and other advantages, a robot that may accurately and efficiently palletize boxes within a work environment may greatly benefit the evolving field of logistics.

Figure 1A:
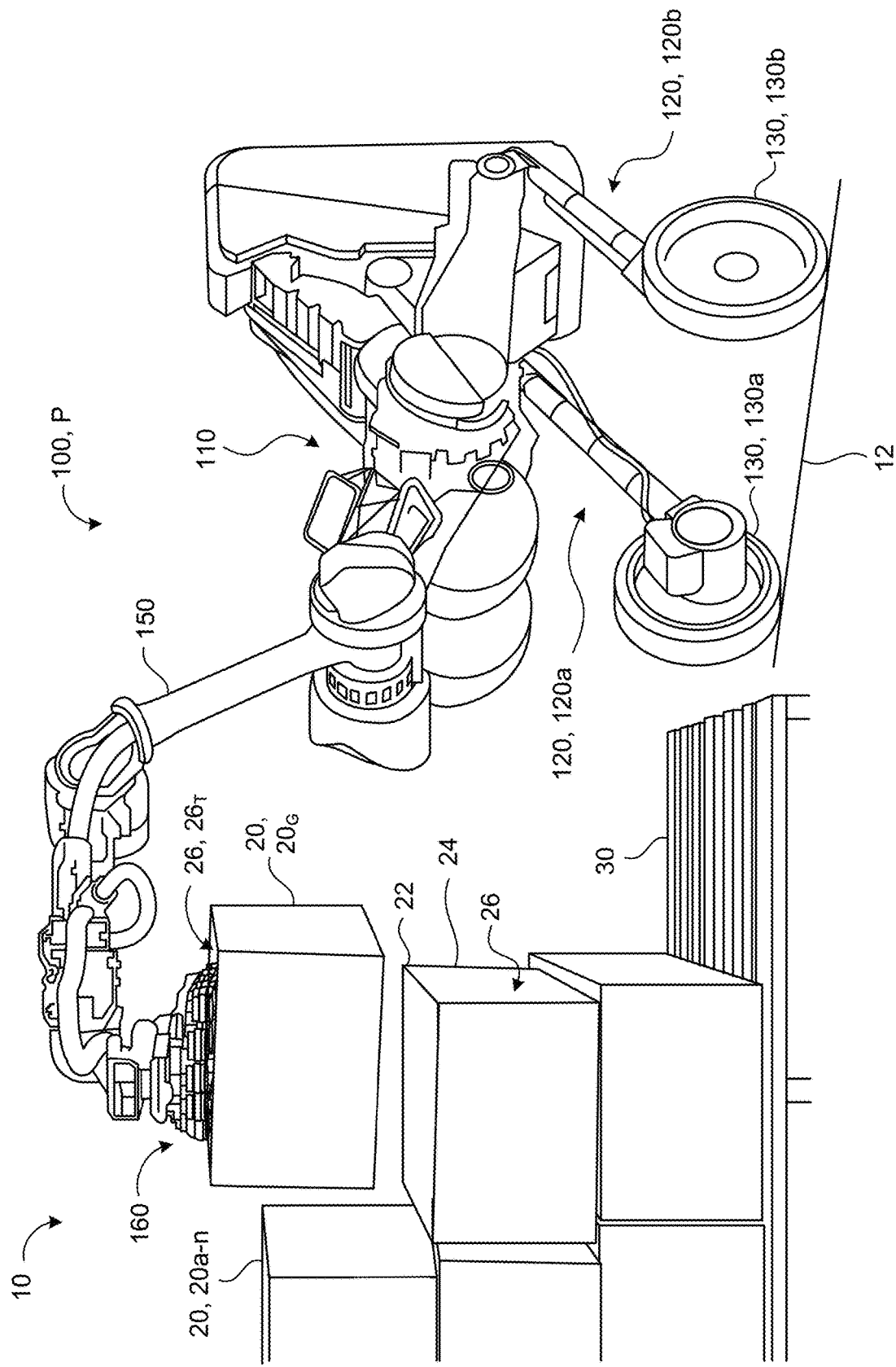
FIG. 1A is a perspective view of an example of a robot grasping a box within an environment.

FIG. 1A is an example of a robot 100 operating within a work environment 10 that includes at least one box 20. Here, the work environment 10 includes a plurality of boxes 20, 20a-n stacked on a pallet 30 lying on a ground surface 12. Generally, boxes 20 are used to package goods for protection, ease of transport, stackability, etc. A box 20 typically has a structure that resembles a rectangular prism or cuboid. A box 20 includes corners 22 where edges 24 of a face 26 intersect. As a rectangular prism, a box 20 includes six faces 26 (also referred to as surfaces of a box 20 or sides of a box 20) where each face 26 is a rectangle formed by a boundary of four edges 24. Each face 26 corresponds to a surface within a spatial plane where the intersection of two planes forms an edge 24. A corner 22 refers to a point or vertex where at least two edges 24 (e.g., two edges for a two-dimensional corner or three edges for a three-dimensional corner) generally intersect at a ninety degree angle (i.e., a right angle). A box 20 has eight corners 22 (i.e., vertices) and twelve edges 24. In logistics, a box 20 often includes a stock keeping unit (SKU) (e.g., in the form of a bar code) for a good contained within the box 20. When palletized (i.e., stacked on a pallet 30), it is common for the SKU or bar code to be located on a face 26 of the box 20 that is exposed.

The work environment 10 may include, for example, a storage facility, distribution center, or fulfillment center. The robot 100 may move (e.g., drive) across the ground surface 12 to detect and/or to manipulate boxes 20 (e.g., palletize) within the work environment 10. For example, the pallet 30 corresponds to a delivery truck that the robot 100 loads. The robot 100 may be associated with a shipping and/or receiving stage of logistics where the robot 100 palletizes boxes 20 for logistics fulfillment or inventory management.

A pallet 30 typically refers to a flat platform structure (i.e., a deck) that supports goods and allows the goods to be transported as a unit (or unit load). Pallets 30 include entry points that enable a jacking device (e.g., a forklift, skid steer, mule, pallet jack, front loader, etc.) to lift the pallet 30 for transportation and ease of mobility. Edges of a pallet 30 form a boundary for goods to be supported by the pallet 30. The goods on a pallet 30 are typically packaged in boxes 20 that form a stack on top of the pallet 30. Pallets 30 may contain any number of boxes 20 in all shapes and sizes. To efficiently utilize space, a pallet 30 may often include a stacked structure of boxes 20 defined by layers L (or rows). The number of layers L or number of boxes 20 that makeup a layer L may vary depending on the size and/or shape of the boxes 20. In some configurations, the size of a pallet 30 is based on an acceptable height (from a top of a deck of the pallet 30 to the top of a top layer box 20) and/or an acceptable weight for transportation. This may vary depending on the type of goods contained within the boxes 20 of a pallet 30. For simplicity, FIGS. 2B-2M, often depict the pallet 30 with two layers L, $L_{1-2}$ where each layer L includes four boxes 20, 20a—d. Often, the boxes 20 on a layer L or between layers L will be interlocked to aid stability for the pallet 30 during transportation. A pallet 30 may therefore refer to both the physical structure supporting the boxes 20 and a unit of boxes 20. Pallets 30 may be referred to by their structure (e.g., block pallets, stringer pallets, winged pallets, flush pallet, reversible pallet, non-reversible pallet, etc.), their material (e.g., skid pallets, metal pallets, wooden pallets, paper pallets, etc.), or by their entry points (e.g., two-way pallet or four-way pallet).

Historically, the term palletize means to place or to stack boxes 20 of goods on a pallet 30. However, palletization has evolved to more generally refer to placing or to stacking boxes 20 of goods on any surface to form a collective unit, even though a pallet 30 is often a convenient surface to stack boxes 20 on for purposes of transportation. The goal of palletization is to result in a tightly bound stack of boxes 20. A tightly bound stack of boxes 20 has minimal to no space between boxes such that the interspatial relationship of the boxes 20 within the stack functions as a means of protection and/or movement reduction (e.g., by utilizing friction forces between surfaces of abutting boxes) during transport. Furthermore, with little to no gap between boxes 20, the boxes 20 may form a collective unit with a mass that is more likely to resist relative motion during transport. In other words, the collective mass of the boxes 20 would require greater forces to generate a momentum that may damage, topple, or generally decouple boxes 20 within the stack. By stacking boxes 20 without a space or a gap between boxes 20, palletization prevents gaps from allowing a box 20 to move or jostle about during transport of a pallet 30. Although the systems of the robot 100 are shown for simplicity with regard to palletizing boxes 20 on a pallet 30, the robot 100 may be configured to palletize (i.e., place/position) boxes 20 together on any surface.

Palletizing boxes 20 may appear to be an ideal task for a robot, but robots often struggle with this task. First off, robots may be designed with a significant amount of strength to perform tasks quickly and/or to perform tasks requiring strength beyond that of an average human. With this strength, a robot may easily push, slide, or topple boxes 20 when attempting to stack boxes 20 together. To compound issues with robot strength, robots may function according to commands and to feedback from executing the commands. Here, when a robot imparts a strong force on a box 20 causing a collision with another box 20, the robot is ill-equipped to compensate for the impact prior to moving the other box 20 to an undesired location. By moving the other box 20 to the undesired location, the robot may compromise the integrity of the unit of stacked boxes 20 (e.g., topple boxes or stack boxes with too much space between each other). Another issue with robots is that when manipulating boxes 20, inaccuracies and/or tolerances between the systems of a robot and the actual location of a stack of boxes 20 may result in placing a box 20 with gaps or spaces between neighboring boxes 20. A similar effect may occur between where a robot perceives that it is spatially holding a box 20 and where it is actually holding the box 20. For instance, if the robot actually lifted a box 20 at a few inches different from its perceived lift position, when placing the box down, the box 20 will transfer the difference of the few inches to the touchdown position for the box 20, resulting in a potential gap of a few inches between the placed box 20 and other boxes 20. These issues may become further complicated when boxes 20 contain goods that have different weights or weight distributions. For instance, if the robot places a box 20 too quickly, even though the placement of the box 20 does not cause a collision with an adjacent box 20, the goods within the placed box 20 may have momentum from the movement by the robot during placement of the box 20 to cause a collision with the adjacent box 20. With these issues, simply moving a box 20 to a target position within a stack of boxes 20, without accommodating for these issues likely results in poor palletization. This is particularly true when any one or a combination of these issues occurs repeatedly during multiple placements of boxes 20 by a robot during palletization. In other words, if a pallet 30 includes two layers $L_{1-2}$ with four boxes 20 to each layer L, the robot unfortunately has eight opportunities to compromise the integrity of a pallet unit. Here, to address these issues, the robot 100 as shown in FIGS. 1A-1C includes systems to reliably and to repeatedly palletize boxes 20.

Figure 1B:
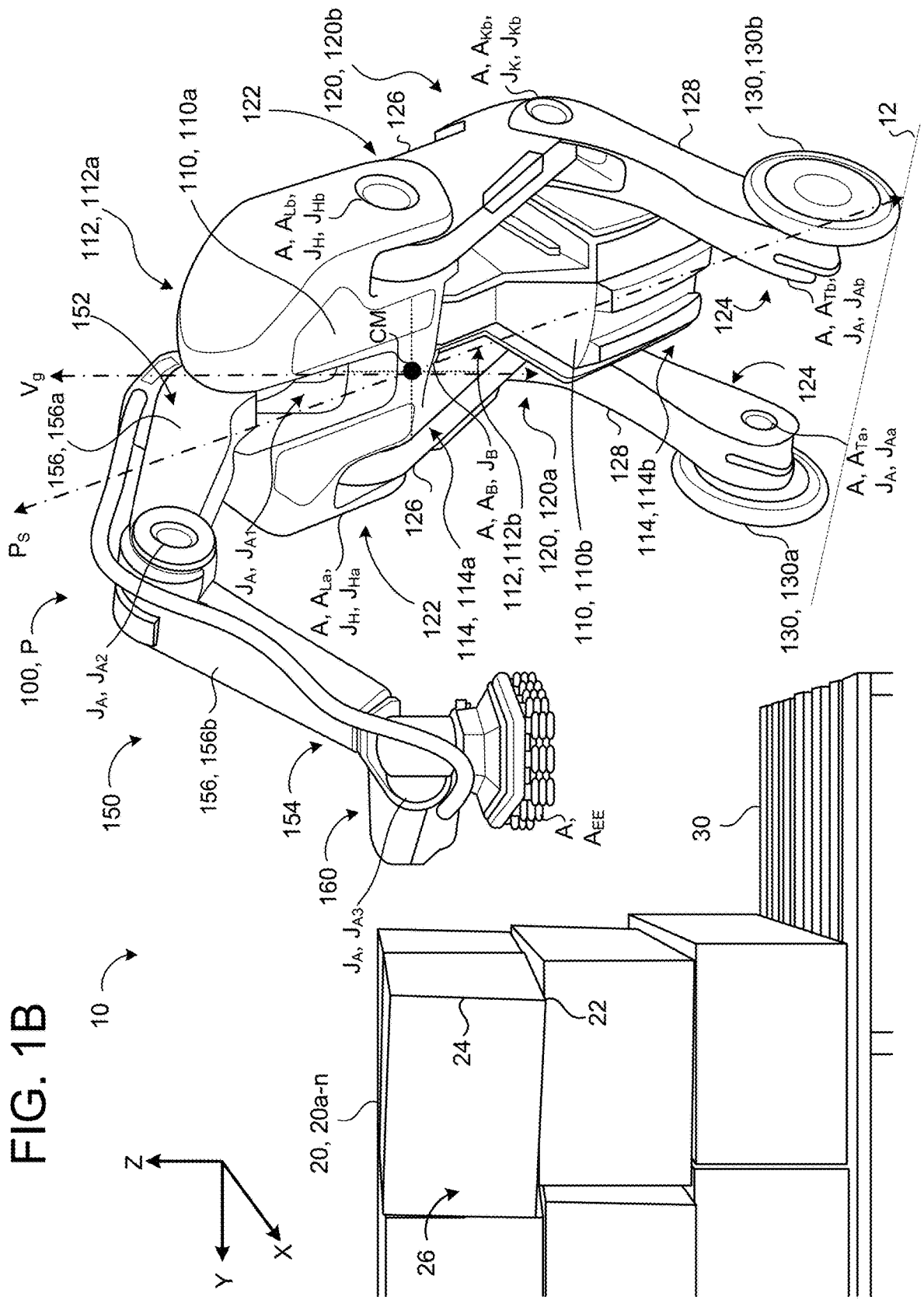
FIG. 1B is a perspective view of an example of the robot.

Referring to FIG. 1B, the robot 100 has a vertical gravitational axis Vg along a direction of gravity, and a center of mass CM, which is a point where the robot 100 has a zero sum distribution of mass. The robot 100 further has a pose P based on the CM relative to the vertical gravitational axis Vg to define a particular attitude or stance assumed by the robot 100. The attitude of the robot 100 can be defined by an orientation or an angular position of an object in space.

The robot 100 generally includes a body 110 and one or more legs 120. The body 110 of the robot 100 may be a unitary structure or a more complex design depending on the tasks to be performed in the work environment 10. The body 110 may allow the robot 100 to balance, to sense the work environment 10, to power the robot 100, to assist with tasks within the work environment 10, or to support other components of the robot 100. In some examples, the robot 100 includes a two-part body 110. For example, the robot 100 includes an inverted pendulum body (IPB) 110, 110a (i.e., referred to as a torso 110a of the robot 100) and a counter-balance body (CBB) 110, 110b (i.e., referred to as a tail 110b of the robot 100) disposed on the IPB 110a.

The body 110 (e.g., the IPB 110a or the CBB 110b) has a first end portion 112 and a second end portion 114. For instance, the IPB 110a has a first end portion 112a and a second end portion 114a, while the CBB 110b has a first end portion 112b and a second end portion 114b. In some implementations, the CBB 110b is disposed on the second end portion 114a of the IPB 110a and configured to move relative to the IPB 110a. In some examples, the counter-balance body 110b includes a battery that serves to power the robot 100. A back joint $J_B$ may rotatably couple the CBB 110b to the second end portion 114a of the IPB 110a to allow the CBB 110b to rotate relative to the IPB 110a. The back joint $J_B$ may be referred to as a pitch joint. In the example shown, the back joint $J_B$ supports the CBB 110b to allow the CBB 110b to move/pitch around a lateral axis (y-axis) that extends perpendicular to the gravitational vertical axis Vg and a fore-aft axis (x-axis) of the robot 100. The fore-aft axis (x-axis) may denote a present direction of travel by the robot 100. Movement by the CBB 110b relative to the IPB 110a alters the pose P of the robot 100 by moving the CM of the robot 100 relative to the vertical gravitational axis Vg. A rotational actuator or back joint actuator A, $A_B$ (e.g., a tail actuator or counter-balance body actuator) may be positioned at or near the back joint $J_B$ for controlling movement by the CBB 110b (e.g., tail) about the lateral axis (y-axis). The rotational actuator $A_B$ may include an electric motor, electro-hydraulic servo, piezo-electric actuator, solenoid actuator, pneumatic actuator, or other actuator technology suitable for accurately effecting movement of the CBB 110b relative to the IPB 110a.

The rotational movement by the CBB 110b relative to the IPB 110a alters the pose P of the robot 100 for balancing and maintaining the robot 100 in an upright position. For instance, similar to rotation by a flywheel in a conventional inverted pendulum flywheel, rotation by the CBB 110b relative to the gravitational vertical axis Vg generates/imparts the moment $M_{CBB}$ at the back joint $J_B$ to alter the pose P of the robot 100. By moving the CBB 110b relative to the IPB 110a to alter the pose P of the robot 100, the CM of the robot 100 moves relative to the gravitational vertical axis Vg to balance and maintain the robot 100 in the upright position in scenarios when the robot 100 is moving and/or carrying a load. However, by contrast to the flywheel portion in the conventional inverted pendulum flywheel that has a mass centered at the moment point, the CBB 110b includes a corresponding mass that is offset from moment imparted at the back joint $J_B$. In some configurations, a gyroscope disposed at the back joint $J_B$ could be used in lieu of the CBB 110b to spin and impart the moment (rotational force) for balancing and maintaining the robot 100 in the upright position.

The CBB 110b may rotate (e.g., pitch) about the back joint $J_B$ in both the clockwise and counter-clockwise directions (e.g., about the y-axis in the "pitch direction") to create an oscillating (e.g., wagging) movement. Movement by the CBB 110b relative to IPB 110a between positions causes the CM of the robot 100 to shift (e.g., lower toward the ground surface 12 or higher away from the ground surface 12). The CBB 110b may oscillate between movements to create the wagging movement. The rotational velocity of the CBB 110b when moving relative to the IPB 110a may be constant or changing (accelerating or decelerating) depending upon how quickly the pose P of the robot 100 needs to be altered for dynamically balancing the robot 100.

The legs 120 are locomotion-based structures (e.g., legs and/or wheels) that are configured to move the robot 100 about the work environment 10. The robot 100 may have any number of legs 120 (e.g., a quadruped with four legs, a biped with two legs, a hexapod with six legs, an arachnid-like robot with eight legs, etc.). For instance, the robot 100 may have a single base or leg 120 functioning as a locomotion-based structure where one or more wheels extend from the base to contact a surface in order to move the robot 100 about the work environment 10. Here, for simplicity, the robot 100 is generally shown and described with two legs 120, 120a—b.

As a two-legged robot 100, the robot includes a first leg 120, 120a and a second leg 120, 120b. In some examples, each leg 120 includes a first end 122 and a second end 124. The second end 124 corresponds to an end of the leg 120 that contacts or is adjacent to a member of the robot 100 contacting a surface (e.g., a ground surface) such that the robot 100 may traverse the work environment 10. For example, the second end 124 corresponds to a foot of the robot 100 that moves according to a gait pattern. In some implementations, the robot 100 moves according to rolling motion such that the robot 100 includes a drive wheel 130. The drive wheel 130 may be in addition to or instead of a foot-like member of the robot 100. For example, the robot 100 is capable of moving according to ambulatory motion and/or rolling motion. Here, the robot 100 depicted in FIG. 1B illustrates the first end 122 coupled to the body 110 (e.g., at the IPB 110a) while the second end 124 is coupled to the drive wheel 130. By coupling the drive wheel 130 to the second end 124 of the leg 120, the drive wheel 130 may rotate about an axis of the coupling to move the robot 100 about the work environment 10.

Hip joints $J_H$ on each side of body 110 (e.g., a first hip joint $J_H$, $J_{Ha}$ and a second hip joint $J_H$, $J_{Hb}$ symmetrical about a sagittal plane $P_S$ of the robot 100) may rotatably couple the first end 122 of a leg 120 to the second end portion 114 of the body 110 to allow at least a portion of the leg 120 to move/pitch around the lateral axis (y-axis) relative to the body 110. For instance, the first end 122 of the leg 120 (e.g., of the first leg 120a or the second leg 120b) couples to the second end portion 114a of the IPB 110a at the hip joint $J_H$ to allow at least a portion of the leg 120 to move/pitch around the lateral axis (y-axis) relative to the IPB 110a.

A leg actuator A, $A_L$ may be associated with each hip joint $J_H$ (e.g., a first leg actuator $A_L$, $A_{La}$ and a second leg actuator $A_L$, $A_{Lb}$). The leg actuator $A_L$ associated with the hip joint $J_H$ may cause an upper portion 126 of the leg 120 (e.g., the first leg 120a or the second leg 120b) to move/pitch around the lateral axis (y-axis) relative to the body 110 (e.g., the IPB 110a). In some configurations, each leg 120 includes the corresponding upper portion 126 and a corresponding lower portion 128. The upper portion 126 may extend from the hip joint $J_H$ at the first end 122 to a corresponding knee joint $J_K$ and the lower portion 128 may extend from the knee joint $J_K$ to the second end 124. A knee actuator A, $A_K$ associated with the knee joint $J_K$ may cause the lower portion 128 of the leg 120 to move/pitch about the lateral axis (y-axis) relative to the upper portion 126 of the leg 120.

Each leg 120 may include a corresponding ankle joint $J_A$ configured to rotatably couple the drive wheel 130 to the second end 124 of the leg 120. For example, the first leg 120a includes a first ankle joint $J_A$, $J_{Aa}$ and the second leg 120b includes a second ankle joint $J_A$, $J_{Ab}$. Here, the ankle joint $J_A$ may be associated with a wheel axle coupled for common rotation with the drive wheel 130 and extending substantially parallel to the lateral axis (y-axis). The drive wheel 130 may include a corresponding torque actuator (drive motor) A, $A_T$ configured to apply a corresponding axle torque for rotating the drive wheel 130 about the ankle joint $J_A$ to move the drive wheel 130 across the ground surface 12 (which may be interchangeably referred to as a work surface 12 or ground plane 12) along the fore-aft axis (x-axis). For instance, the axle torque may cause the drive wheel 130 to rotate in a direction for moving the robot 100 in a forward direction along the fore-aft axis (x-axis) and/or cause the drive wheel 130 to rotate in an opposite direction for moving the robot 100 in a rearward direction along the fore-aft axis (x-axis).

In some implementations, the legs 120 are prismatically coupled to the body 110 (e.g., the IPB 110a) such that a length of each leg 120 may expand and retract via a corresponding actuator (e.g., leg actuators $A_L$) proximate the hip joint $J_H$, a pair of pulleys (not shown) disposed proximate the hip joint $J_H$ and the knee joint $J_K$, and a timing belt (not shown) synchronizing rotation of the pulleys. Each leg actuator $A_L$ may include a linear actuator or a rotational actuator. Here, a control system 140 with a controller 142 (e.g., shown in FIG. 1C) may actuate the actuator associated with each leg 120 to rotate the corresponding upper portion 126 relative to the body 110 (e.g., the IPB 110a) in one of a clockwise direction or a counter-clockwise direction to prismatically extend/expand the length of the leg 120 by causing the corresponding lower portion 128 to rotate about the corresponding knee joint $J_K$ relative to the upper portion 126 in the other one of the clockwise direction or the counter-clockwise direction. Optionally, instead of a two-link leg, the at least one leg 120 may include a single link that prismatically extends/retracts linearly such that the second end 124 of the leg 120 prismatically moves away/toward the body 110 (e.g., the IPB 110a) along a linear rail. In other configurations, the knee joint $J_K$ may employ a corresponding rotational actuator as the knee actuator $A_K$ for rotating the lower portion 128 relative to the upper portion 126 in lieu of the pair of synchronized pulleys.

The corresponding axle torques applied to each of the drive wheels 130 (e.g., a first drive wheel 130, 130a associated with the first leg 120a and a second drive wheel 130, 130b associated with the second leg 120b) may vary to maneuver the robot 100 across the ground surface 12. For instance, an axle torque applied to the first drive wheel 130a that is greater than an axle torque applied to the second drive wheel 130b may cause the robot 100 to turn to the left, while applying a greater axle torque to the second drive wheel 130b than to the first drive wheel 130 may cause the robot 100 to turn to the right. Similarly, applying substantially the same magnitude of axle torque to each of the drive wheels 130 may cause the robot 100 to move substantially straight across the ground surface 12 in either the forward or reverse directions. The magnitude of axle torque applied to each of the drive wheels 130 also controls velocity of the robot 100 along the fore-aft axis (x-axis). Optionally, the drive wheels 130 may rotate in opposite directions to allow the robot 100 to change orientation by swiveling on the ground surface 12. Thus, each axle torque may be applied to the corresponding drive wheel 130 independent of the axle torque (if any) applied to the other drive wheel 130.

In some examples, the body 110 (e.g., at the CBB 110b) also includes at least one non-drive wheel (not shown). The non-drive wheel is generally passive (e.g., a passive caster wheel) such that movement of the non-drive wheel is dictated by other drive wheels or locomotion associated with the robot 100. For example, the non-drive wheel does not contact the ground surface 12 unless the body 110 moves to a pose P where the body 110 (e.g., the CBB 110b) is supported by the ground surface 12.

In some implementations, the robot 100 further includes one or more appendages, such as an articulated arm 150 (also referred to as an arm or a manipulator arm) disposed on the body 110 (e.g., on the IPB 110a) and configured to move relative to the body 110. The articulated arm 150 may have one or more degrees of freedom (e.g., ranging from relatively fixed to capable of performing a wide array of tasks in the work environment 10). Here, the articulated arm 150 illustrated in FIG. 1B has five-degrees of freedom. While FIG. 1B shows the articulated arm 150 disposed on the first end portion 112 of the body 110 (e.g., at the IPB 110a), the articulated arm 150 may be disposed on any part of the body 110 in other configurations. For instance, the articulated arm 150 is disposed on the CBB 110b or on the second end portion 114a of the IPB 110a.

The articulated arm 150 extends between a proximal first end 152 and a distal second end 154. The arm 150 may include one or more arm joints $J_A$ between the first end 152 and the second end 154 where each arm joint $J_A$ is configured to enable the arm 150 to articulate in the work environment 10. These arm joints $J_A$ may either couple an arm member 156 of the arm 150 to the body 110 or couple two or more arm members 156 together. For example, the first end 152 connects to the body 110 (e.g., the IPB 110a) at a first articulated arm joint $J_{A1}$ (e.g., resembling a shoulder joint). In some configurations, the first articulated arm joint $J_{A1}$ is disposed between the hip joints $J_H$ (e.g., aligned along the sagittal plane $P_S$ of the robot 100 at the center of the body 110). In some examples, the first articulated arm joint $J_{A1}$ rotatably couples the proximal first end 152 of the arm 150 to the body 110 (e.g., the IPB 110a) to enable the arm 150 to rotate relative to the body 110 (e.g., the IPB 110a). For instance, the arm 150 may move/pitch about the lateral axis (y-axis) relative to the body 110.

In some implementations, such as FIG. 1B, the arm 150 includes a second arm joint $J_{A2}$ (e.g., resembling an elbow joint) and a third arm joint $J_{A3}$ (e.g., resembling a wrist joint). The second arm joint $J_{A2}$ couples a first arm member 156a to a second arm member 156b such that these members 156a—b are rotatable relative to one another and also to the body 110 (e.g., the IPB 110). Depending on a length of the arm 150, the second end 154 of the arm 150 coincides with an end of an arm member 156. For instance, although the arm 150 may have any number of arm members 156, FIG. 1B depicts the arm 150 with two arm members 156a—b such that the end of the second arm member 156b coincides with the second end 154 of the arm 150. Here, at the second end 154 of the arm 150, the arm 150 includes an end-effector 160 that is configured to perform tasks within the work environment 10. The end-effector 160 may be disposed on the second end 154 of the arm 150 at an arm joint $J_A$ (e.g., at the third arm joint $J_{A3}$) to allow the end-effector 160 to have multiple degrees of freedom during operation. The end-effector 160 may include one or more end-effector actuators A, $A_{EE}$ for gripping/grasping objects. For instance, the end-effector 160 includes one or more suction cups as end-effector actuators $A_{EE}$ to grasp or to grip objects by providing a vacuum seal between the end-effector 160 and a target object, e.g., a target box.

The articulated arm 150 may move/pitch about the lateral axis (y-axis) relative to the body 110 (e.g., the IPB 110a). For instance, the articulated arm 150 may rotate about the lateral axis (y-axis) relative to the body 110 in the direction of gravity to lower the CM of the robot 100 while executing turning maneuvers. The CBB 110b may also simultaneously rotate about the lateral axis (y-axis) relative to the IPB 110 in the direction of gravity to assist in lowering the CM of the robot 100. Here, the articulated arm 150 and the CBB 110b may cancel out any shifting in the CM of the robot 100 in the forward or rearward direction along the fore-aft axis (x-axis), while still effectuating the CM of the robot 100 to shift downward closer to the ground surface 12.

With reference to FIG. 1C, the robot 100 includes a control system 140 configured to monitor and to control operation of the robot 100. In some implementations, the robot 100 is configured to operate autonomously and/or semi-autonomously. However, a user may also operate the robot 100 by providing commands/directions to the robot 100. In the example shown, the control system 140 includes a controller 142 (e.g., data processing hardware) and memory hardware 144. The controller 142 may include its own memory hardware or utilize the memory hardware 144 of the control system 140. In some examples, the control system 140 (e.g., with the controller 142) is configured to communicate (e.g., command motion) with the actuators A (e.g., back actuator(s) $A_B$, leg actuator(s) $A_L$, knee actuator(s) $A_K$, drive belt actuator(s), rotational actuator(s), end-effector actuator(s) $A_{EE}$, etc.) to enable the robot 100 to move about the work environment 10. The control system 140 is not limited to the components shown, and may include additional (e.g., a power source) or less components without departing from the scope of the present disclosure. The components may communicate by wireless or wired connections and may be distributed across multiple locations of the robot 100. In some configurations, the control system 140 interfaces with a remote computing device and/or a user. For instance, the control system 140 may include various components for communicating with the robot 100, such as a joystick, buttons, transmitters/receivers, wired communication ports, and/or wireless communication ports for receiving inputs from the remote computing device and/or user, and providing feedback to the remote computing device and/or user.

The controller 142 corresponds to data processing hardware that may include one or more general purpose processors, digital signal processors, and/or application specific integrated circuits (ASICs). In some implementations, the controller 142 is a purpose-built embedded device configured to perform specific operations with one or more subsystems of the robot 100. The memory hardware 144 is in communication with the controller 142 and may include one or more non-transitory computer-readable storage media such as volatile and/or non-volatile storage components. For instance, the memory hardware 144 may be associated with one or more physical devices in communication with one another and may include optical, magnetic, organic, or other types of memory or storage. The memory hardware 144 is configured to, inter alia, to store instructions (e.g., computer-readable program instructions), that when executed by the controller 142, cause the controller 142 to perform numerous operations, such as, without limitation, altering the pose P of the robot 100 for maintaining balance, maneuvering the robot 100, detecting objects, transporting objects, and/or performing other tasks within the work environment 10. The controller 142 may perform the operations based on direct or indirect interactions with a sensor system 170.

The sensor system 170 includes one or more sensors 172, 172a-n. The sensors 172 may include image sensors (e.g., vision sensors or perception sensors), inertial sensors (e.g., an inertial measurement unit (IMU)), and/or kinematic sensors. Some examples of image sensors 172 include a camera such as a monocular camera or a stereo camera, a time of flight (TOF) depth sensor, a scanning light-detection and ranging (LIDAR) sensor, or a scanning laser-detection and ranging (LADAR) sensor. More generically, the sensors 172 may include one or more of force sensors, torque sensors, velocity sensors, acceleration sensors, position sensors (linear and/or rotational position sensors), motion sensors, location sensors, load sensors, temperature sensors, touch sensors, depth sensors, ultrasonic range sensors, infrared sensors, and/or object sensors. In some examples, the sensor 172 has a corresponding field(s) of view defining a sensing range or region corresponding to the sensor 172. Each sensor 172 may be pivotable and/or rotatable such that the sensor 172 may, for example, change the field of view about one or more axis (e.g., an x-axis, a y-axis, or a z-axis in relation to a ground surface 12). In some implementations, the body 110 of the robot 100 includes a sensor system 170 with multiple sensors 172 about the body to gather sensor data 174 in all directions around the robot 100. Additionally or alternatively, sensors 172 of the sensor system 170 may be mounted on the arm 150 of the robot 100 (e.g., in conjunction with one or more sensors 172 mounted on the body 110). The robot 100 may include any number of sensors 172 as part of the sensor system 170 in order to generate sensor data 172 for the work environment 10 about the robot 100.

For instance, when the robot 100 is maneuvering about the work environment 10, the sensor system 170 gathers pose data for the robot 100 that includes inertial measurement data (e.g., measured by an IMU). In some examples, the pose data includes kinematic data and/or orientation data about the robot 100.

When surveying a field of view with a sensor 172, the sensor system 170 generates sensor data 174 (also referred to as image data 174) corresponding to the field of view. For image sensors 172, the sensors 172 may capture images 176 as sensor data 174 at a particular frequency such that the sensor data 174 includes frames F corresponding to the field of view at a time interval. In configurations where the sensor system 170 includes multiple image sensors 172, the sensor system 170 may be configured to control a direction (e.g., field of view) of each sensor 172 such that more than one field of view corresponding to an image sensor 172 overlaps to allow for different types of image data 174 to be used in image processing together. In some examples, the sensor system 170 includes at least one monocular camera as a first sensor 172, 172a and at least one depth sensor (e.g., stereo camera, LIDAR, TOF, etc.) as a second sensor 172, 172b. The sensors 172a—b may overlap their fields of view. With overlapping fields of view, the sensors 172a—b capture a monocular image (i.e., two-dimensional) and a depth image (i.e., three-dimensional) at the same instance in time for the same field of view (or nearly the same field of view depending on sensor mounting placement) of the work environment 10.

Sensor data 174 gathered by the sensor system 170, such as the image data, pose data, inertial data, kinematic data, etc., relating to the environment 10 may be communicated to the control system 140 (e.g., the controller 142 and/or memory hardware 144) of the robot 100. In some examples, the sensor system 170 gathers and stores the sensor data 174 (e.g., in the memory hardware 144 or memory hardware related to remote resources communicating with the robot 100). In other examples, the sensor system 170 gathers the sensor data 174 in real-time and processes the sensor data 174 without storing raw (i.e., unprocessed) sensor data 174. In yet other examples, the controller system 140 and/or remote resources store both the processed sensor data 174 and raw sensor data 174. The sensor data 174 from the sensors 172 may allow systems of the robot 100 to detect and/or to analyze conditions about the robot 100. For instance, the sensor data 174 may allow the control system 140 to maneuver the robot 100, alter a pose P of the robot 100, and/or actuate various actuators A for moving/rotating mechanical components of the robot 100.

In some examples, such as FIG. 1C, the sensor system 170 includes one or more sensors 172 mounted on or coupled to the wrist joint $J_{A3}$ of the arm 150. For instance, a wrist sensor 172 is a six-axis force/torque sensor 172. Here, the sensor 172 senses the force(s) on the box 20 that the robot 100 is holding. The palletizer 200 uses this force on the box 20 that the robot 100 is holding to indirectly detect interaction between the box 20 that the robot 100 is holding and one or more other boxes 20. In some implementations, the palletizer 200 determines (or receives from another system of the robot 100) a velocity for the box 20 that the robot 100 is holding based on the joints J of the robot 100. In other words, with the sensor system 170, the robot 100 may determine the velocity corresponding to each joint J and the drive wheel(s) 130. Based on these velocities, the robot 100 determines how fast the end-effector 160 is moving with the box 20 and uses this to derive the velocity of the box 20.

In some configurations, the robot 100 uses a similar approach for force sensing. More specifically, the robot 100 may determine the force at the end-effector 160 based on a combination of forces about one or more joints J and kinematics of the robot 100. This approach may prove difficult when a design of the robot 100 values speed and/or precision. For example, when determining the force based on a joint J other than the wrist joint $J_{A3}$, such as the shoulder joint $J_{A1}$, acceleration of the end-effector 160 will result in the robot 100 sensing both an inertial force of the inertial mass (e.g., in the case of the shoulder joint $J_{A1}$, the inertial force of the arm 150) and a force at the end-effector 160. Therefore, when the robot 100 wants to minimize computational resources and/or prevent potential inaccuracies, the robot 100 senses the force about the end-effector 160 at a position closest to the end-effector 160 (e.g., the wrist joint $J_{A3}$).

In some examples, the robot 100 uses joint force feedback control and end-effector impedance control to make the end-effector 160 motion compliant. For instance, the impedance control is augmented according to force-feedback from the wrist sensor 172 mounted on or coupled to the wrist joint $J_{A3}$ (e.g., sensing the end-effector 160). Here, the impedance control includes, as inputs, a desired end-effector position and a measured end-effector position. Optionally, other inputs of the impedance control may include a desired end-effector velocity and/or acceleration as well as a measured end-effector velocity and/or acceleration. Given these inputs, the impedance control outputs a desired end-effector force. In some implementations, the impedance control is configured such that the relationship between these inputs and outputs corresponds to spring-like properties, such as stiffness, dampening, or inertia.

In order to build stacks of boxes 20 in a tightly packed manner, the robot 100 must overcome the errors between where the robot 100 thinks something is located and where it is actually located (i.e., perception errors). For instance, when a robot 100 uses a vision system (i.e., vision based sensors 172) to identify the location of the box 20 that the robot 100 is holding or to identify a target position (e.g., a target box location 202 (FIG. 2A)) for the box 20 to be placed on a pallet 30, both of these locations suffer from some degree of error. Relying on these perceptions of the robot 100 alone would translate these errors to placement errors during palletization. To deal with uncertainties with the perception of the robot 100, the robot 100 is configured to feel its way into a target position for the box 20 using one or more of movements with the box 20 it holds. In contrast, traditionally, robots are programmed where a box 20 should go and a robot tends to move the box 20 stiffly to that position. This traditional approach makes it easy for a robot 100 to disrupt and/or disturb other boxes in the vicinity.

The box 20 that the robot 100 is holding is referred to as a "grasped box $20_G$." When a robot 100 uses the end-effector 160 of the arm 150 to couple itself to a box 20, the box 20 becomes grasped by the robot 100. As shown in FIG. 1A, the robot 100 grasps the box 20 with the end-effector 160 of the arm 150 (e.g., with the end-effector actuator $A_{EE}$) at a top surface 26, 26T of the grasped box $20_G$. For instance, the end-effector 160 uses suction force with suction cups as the end-effector actuator $A_{EE}$ to grasp the box 20. In other examples, the robot 100 has more than one arm 150 and grasps the box 20 collectively with at least two arms 150 by squeezing the arms 150 toward each other against sides (i.e., faces 26) of the box 20. Regardless of the grasping approach, the palletizer 200 is configured to place the grasped box $20_G$ in a target box location 202 to form a stack of boxes 20 with minimal to no space between boxes 20 of the stack (e.g., adjacent boxes are effectively mating or abutting).

Figure 2A:
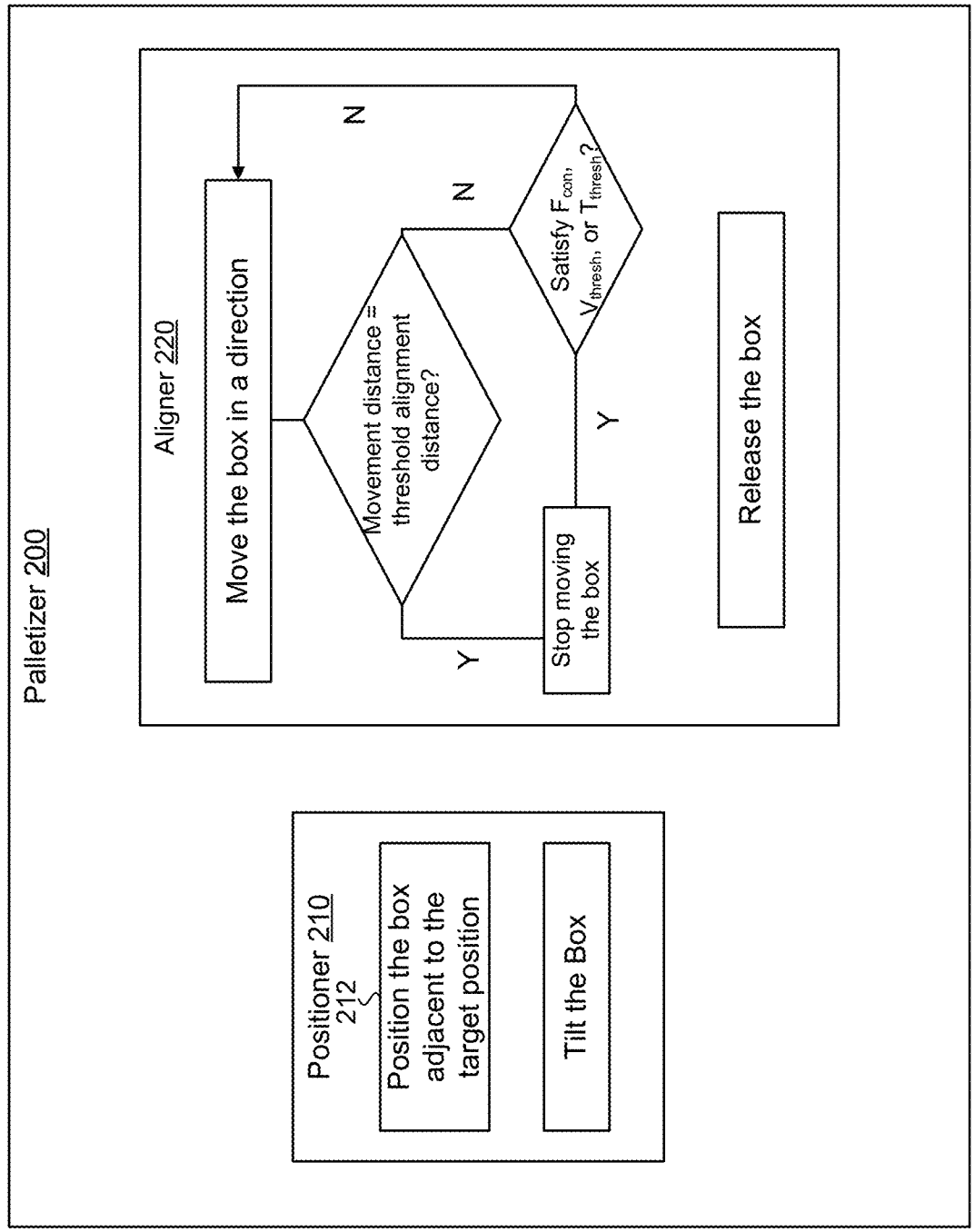
FIG. 2A is schematic view of an example palletizer for the robot of FIG. 1A.

Referring to FIG. 2A, the palletizer 200 includes a positioner 210 and an aligner 220. The palletizer 200 is configured to receive a target box location 202 for a grasped box $20_G$ that identifies a location of where to place the grasped box $20_G$. The target box location 202 may be within an existing stack of boxes 20 (e.g., on a pallet 30) or to begin a stack of boxes 20. In an ideal world, this robot 100 would place the grasped box $20_G$ at this target box location 202 and a stack of boxes 20 at the location would not be disrupted. However, with perception errors, control tolerances, and/or box variance, moving the grasped box $20_G$ to the target box location 202 has a chance of disrupting other boxes 20. Instead, the palletizer 200 systematically tries to feel when the grasped box $20_G$ achieves a position with an acceptable interspatial relationship with the neighboring boxes 20. In some examples, the palletizer 200 considers minimal to no space between neighboring boxes 20 as the acceptable interspatial relationship.

The positioner 210 is configured to place the grasped box $20_G$ at an initial position 212 adjacent to the target box location 202. The initial position 212 is intended to be a space unoccupied by another object (e.g., another box 20). For instance, the initial position 212 is offset from the target box location 202 to start the palletizing process from an unoccupied position so that the robot 100 may accurately sense when the grasped box $20_G$ encounters another box 20.

Figure 2B:
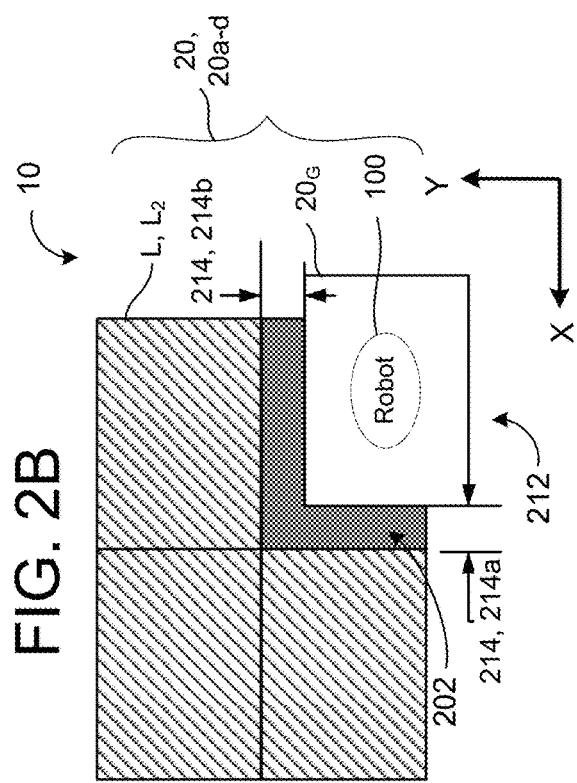
FIG. 2B is a top view of an example of the robot of FIG. 1A positioning a grasped box at a stack of boxes on a pallet.
Figure 2C:
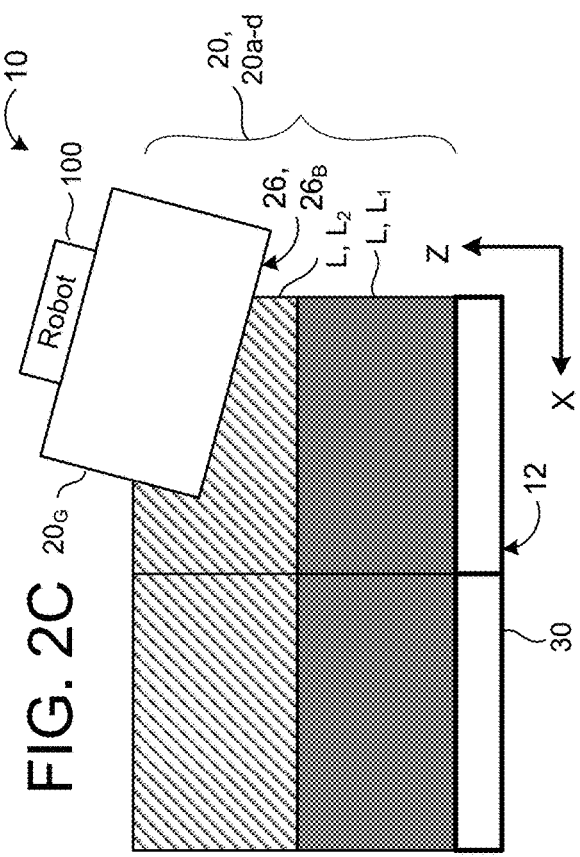
FIG. 2C is a front view of an example of the robot of FIG. 1A positioning a grasped box at a stack of boxes on a pallet.
Figure 2D:
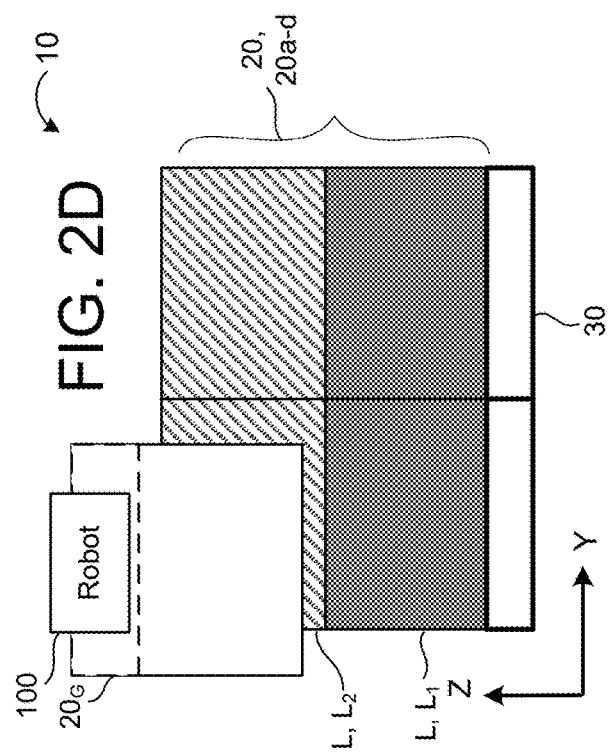
FIG. 2D is a side view of an example of the robot of FIG. 1A positioning a grasped box at a stack of boxes on a pallet.

FIGS. 2B-2D are examples of the grasped box $20_G$ at the initial position 212. In some implementations, as shown by FIG. 2B, the initial position 212 includes an offset 214 in a first direction (e.g., the y-direction) and an offset 214 in a second direction (e.g., the x-direction). In some examples, a system of the robot 100, such as the palletizer 200 of FIG. 2A, determines the offsets 214 based on sensor data 174 from the sensor system 170. With the sensor data 174, the robot 100 determines that the offset 214 is a first compensation distance in the first direction (e.g., the x-direction) and a second compensation distance in the second direction (e.g., the y-direction). Here, the offsets 214 compensate for perception errors of the robot 100 (e.g., the difference between an actual position of the box 20 and a perceived position of the box 20 based on the sensor data 174). The robot 100 may be configured to determine a typical value for these errors in order to generate the offsets 214. In some examples, the offsets 214 account for errors such as a position of the end-effector 160, a position of a box 20 relative to the end-effector 160, and/or a position of boxes 20 that correspond to a stack of boxes 20 relative to the robot 100. When the robot 100 determines the first compensation distance and the second compensation distance based on an amount of error (e.g., an average amount of error), the initial position 212 is defined by a first offset 214, 214a in the first direction (e.g., x-direction) and a second offset 214, 214b in the second direction (e.g., y-direction). Each offset 214 may additionally include a tolerance to ensure that the initial position 212 is not occupied. In other words, if the offsets 214 were solely equal to the average error in each direction, the initial position 212 may be occupied or partially occupied. For instance, if the typical error is 3 cm, the offsets 214 may total 5 cm to include an additional tolerance of 2 cm.

Referring to FIGS. 2C and 2D, in some configurations, the positioner 210 positions the grasped box $20_G$ above the target box location 202 (relative to the z-direction) without contacting an adjacent box 20. By positioning the grasped box $20_G$ in a hovering state above the target box location 202, the palletizer 200 may eliminate friction between the grasped box $20_G$ and other boxes 20 as the grasped box $20_G$ moves to the target box location 202. Without friction, the robot 100 may more easily sense contact forces between the grasped box $20_G$ and other boxes 20. Since the grasped box $20_G$ may be held above the target box location 202 at some height, the aligner 220 may lower the grasped box $20_G$ before releasing it. An amount the aligner 220 lowers the grasped box $20_G$ prior to releasing it may vary depending on variables such as the height of the grasped box $20_G$ in the hovering state, an operational speed of the robot 100, and/or the contents of the grasped box $20_G$ (if known or determined based on sensors 172 while the robot 100 lifts/carries the grasped box $20_G$).

Figure 2K:
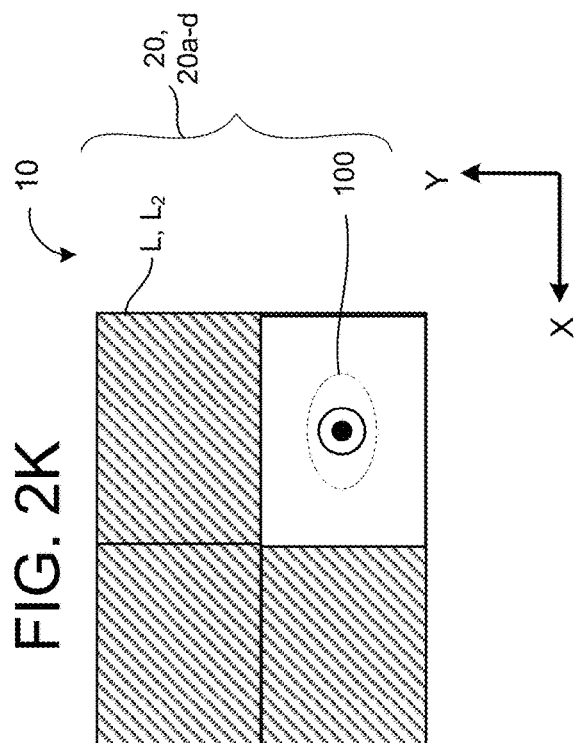
FIG. 2K is a top view of an example of the robot of FIG. 1A releasing the grasped box into a position with the stack of boxes on a pallet.
Figure 2L:
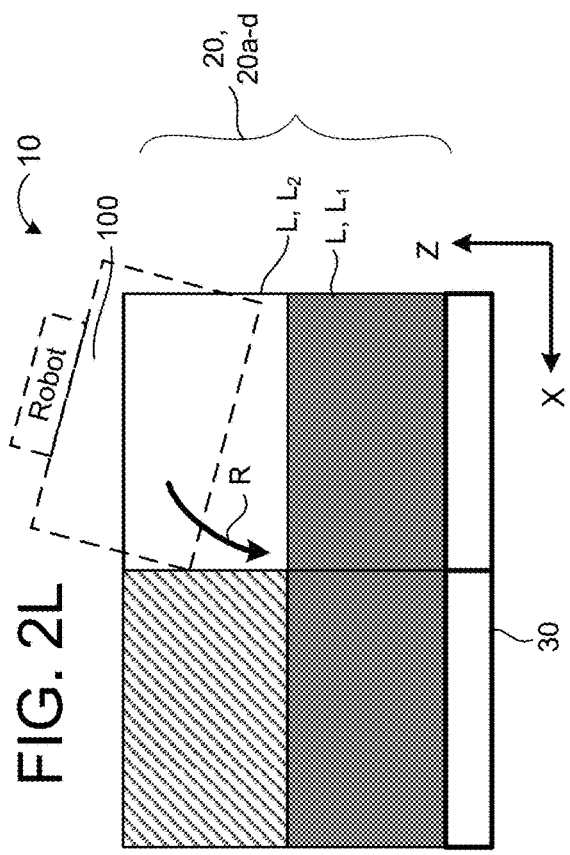
FIG. 2L is a front view of an example of the robot of FIG. 1A releasing the grasped box into a position with the stack of boxes on a pallet.
Figure 2M:
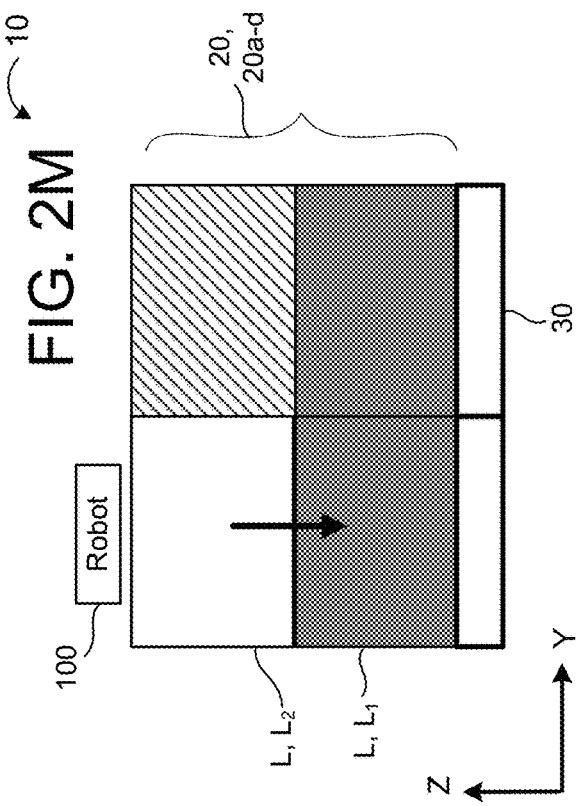
FIG. 2M is a side view of an example of the robot of FIG. 1A releasing the grasped box into a position with the stack of boxes on a pallet.

With continued reference to FIGS. 2A and 2C, the positioner 210 is configured to tilt the grasped box $20_G$ at an angle relative to the ground surface 12 (or ground plane). In other words, the bottom surface 26, 26B (i.e., bottom face 26) of the grasped box $20_G$ forms an angle with the ground surface 12. In some examples, the grasped box $20_G$ is tilted upwards towards an adjacent box 20. Here, when the grasped box $20_G$ is released R (FIG. 2L) by the robot 100, the now released box 20 will pivot toward the adjacent box 20 such that an edge 24 and a face 26 of the pivoting box 20 will abut an edge 24 and a face 26 of the adjacent box 20 resulting in little to no gap between boxes 20 (e.g., as illustrated by FIGS. 2K-2M). In other words, an edge 24 of the box 20 that the robot 100 (e.g., the edge 24G as shown in FIG. 2I) releases may use a face 26 of an adjacent box 20 as a guide to achieve the target box location 202 due to the tilt (e.g., a mating relationship between the opposing faces 26 of the released box 20 and the adjacent box 20). In some examples, such as in FIGS. 2C and 2D, the positioner 210 may tilt the grasped box $20_G$ at or before the grasped box $20_G$ is in the initial position 212. In other examples, the positioner 210 tilts the grasped box $20_G$ as the aligner 220 moves the grasped box $20_G$ from the initial position 212.

With continued reference to FIG. 2A, the aligner 220 of the palletizer 200 is configured to move the grasped box $20_G$ to the target box location 202 from the initial position 212. When the grasped box $20_G$ moves to the target box location 202 or as close to the target box location 202 as other boxes 20 allow, the aligner 220 releases the grasped box $20_G$ to seat the grasped box $20_G$ in place (e.g., as shown in FIGS. 2K-2M). In some examples, the aligner 220 moves the grasped box $20_G$ in two distinct motions to achieve an alignment position 222 near or at the target box location 202. For instance, FIGS. 2E-2G illustrate the aligner 220 shifting the grasped box $20_G$ in a first direction $D_1$ (e.g., along the y-direction) while FIGS. 2H-2J illustrate the aligner 220 shifting the grasped box $20_G$ in a second direction $D_2$ (e.g., the x-direction). In some examples, the first direction $D_1$ is perpendicular to the second direction $D_2$. In some implementations, the aligner 220 shifts the grasped box $20_G$ along a movement vector that has a component of a first direction and a component of a second direction (e.g., the aligner 220 shifts the grasped box $20_G$ at an angle in the x-y plane). Additionally or alternatively, because the work environment 10 is a three-dimensional space, the movement vector may include a third direction (e.g., the movement vector includes a component of the z-direction). Thus, even though FIGS. 2B-2J indicate that the aligner 220 may move sequentially in each direction, the aligner 220 may be configured to shift the grasped box $20_G$ in any order of directions and/or all directions of the three-dimensional space simultaneously. When the aligner 220 moves the grasped box $20_G$ in a given direction, there are a few conditions that the palletizer 200 and/or the aligner 220 monitor during movement.

In some examples, the aligner 220 moves the grasped box $20_G$ until the grasped box $20_G$ reaches an alignment position 222. To illustrate, from FIGS. 2B-2D to FIGS. 2E-2G, the aligner 220 has moved the grasped box $20_G$ from the initial position 212 (FIG. 2B) to the first alignment position 222a (FIGS. 2E-2G). In some examples, when the aligner 220 shifts the grasped box $20_G$ from the initial position 212 in the first direction $D_1$ to the first alignment position 222, 222a, the aligner 220 determines whether the first alignment position 222a satisfies a threshold first alignment distance 224, 224a (e.g., shown in FIG. 2E). The threshold first alignment distance 224a corresponds to a finite distance that the aligner 220 may move the grasped box $20_G$ in a given direction. With a finite distance, the palletizer 200 prevents the grasped box $20_G$ from deviating too far from the target box location 202. For instance, without the finite distance, the robot 100 may move the grasped box $20_G$ entirely off the stack of boxes 20 while waiting for a contact force or a particular velocity to stop the movement of the grasped box $20_G$. The finite distance may also prevent the aligner 220 from exacerbating misalignment when moving the grasped box $20_G$. For example, a box 20 on a stack of boxes 20 may have a large offset from its ideal location. If the aligner 220 were to move the grasped box $20_G$ to abut the box 20 that is out of position with the large offset, the grasped box $20_G$ would also share in misalignment. In some examples, the threshold alignment distance 224 corresponds to a maximum movement distance that the aligner 220 is permitted to move the grasped box $20_G$.

Referring to FIGS. 2H-2J, the aligner 220 shifts the grasped box $20_G$ from the first alignment position 222a (as shown in FIGS. 2E-2G) in the second direction $D_2$ to the target box location 202 (or near the target box location 202 as permitting). When the aligner 220 shifts the grasped box $20_G$ from the first alignment position 222 in the second direction $D_2$ to the target box location 202, the aligner 220 determines whether the movement to the target box location 202 satisfies a threshold second alignment distance 224, 224b (e.g., shown in FIG. 2H). In some examples, the threshold second alignment distance 224b has the same magnitude as the threshold first alignment distance 224a. In other examples, these threshold alignment distances 224 are different due to a shape of the box 20. For instance, each box 20 may be an elongated rectangular prism such that the threshold alignment distance 224 along a length of a rectangular prism is greater than the threshold alignment distance 224 corresponding to a width of the rectangular prism.

During the movement by the aligner 220, the grasped box $20_G$ may achieve other conditions before the threshold alignment distance 224 occurs. For instance, the palletizer 200 may sense that due to a threshold contact force $F_{thresh}$ or a threshold velocity $v_{thresh}$ that the grasped box $20_G$ should stop moving (i.e., has achieved the first alignment position 222 or the target box location 202). In other words, the threshold contact force $F_{thresh}$ or the threshold velocity $v_{thresh}$ indicates that the grasped box $20_G$ has met a resistance caused by an adjacent box 20. Here, the palletizer 200 ideally wants to cause a non-disruptive perfectly inelastic collision such that the grasped box $20_G$ and the adjacent box 20 form the acceptable interspatial relationship for stacking the boxes 20 (e.g., without the grasped box $20_G$ knocking an adjacent box 20 out of position and/or without gaps detrimental to transportation). As such, the threshold contact force $F_{thresh}$ refers to a magnitude of a force that represents that the grasped box $20_G$ has initiated contact with at least one adjacent box 20 during palletization, but also that the magnitude of the force has not significantly disturbed the at least one adjacent box 20 (e.g., not enough magnitude to overcome the static force of friction). In a similar respect, the threshold velocity $v_{thresh}$ refers to a velocity that indicates the robot 100 (e.g., at by the end-effector 160) is generating a movement force, but that the grasped box $20_G$ is no longer moving due to the resistance caused by an adjacent box 20. For instance, the threshold velocity $v_{thresh}$ is set to zero to indicate a lack of movement by the grasped box $20_G$. In some examples, the threshold contact force $F_{thresh}$ and/or the threshold velocity $v_{thresh}$ are represented as vectors. As vectors, the palletizer 200 may use the total magnitude of these vectors (e.g., in the three-dimensional work environment) or a component of these vectors (e.g., in a direction the aligner 220 is currently moving the grasped box $20_G$) to determine whether these thresholds are satisfied.

In some examples, a magnitude of the threshold contact force $F_{thresh}$ is task specific. For instance, the robot 100 receives instructions that indicate the boxes 20 that will be stacked together and information regarding these boxes 20. Here, the information may include a weight of each box 20. Other types of information include a type of material for the box itself (e.g., a standard corrugated box or a surface coated box) such that the robot 100 may account for frictional coefficients between boxes 20 during palletization. Based on the information, the robot 100 may configure the threshold contact force $F_{thresh}$. For instance, the palletizer 200 sets the threshold contact force $F_{thresh}$ to correspond to a maximum force the robot 100 can exert on the boxes 20 that is less than a force F that is expected to move previously placed boxes 20. In some implementations, the sensors 172 of the robot 100 determine the weight of each previously placed box 20 and use the determined weight to set the threshold contact force $F_{thresh}$. In some examples, the palletizer 200 uses a combination of the impedance control and the force feedback control to actively limit the forces exerted by the robot 100 on the boxes 20 (i.e., to set the threshold contact force $F_{thresh}$). For instance, the robot 100 limits the desired end-effector force from the impedance control to be less than a force that is expected to move previously placed boxes 20 (e.g., considering physical properties of the previously placed boxes 20 such as mass, frictional coefficients, etc.). By limiting the desired end-effector force, the impedance control limits how much force the robot 100 exerts on the grasped box $20_G$ and thus limits the force the grasped box $20_G$ may transfer when the grasped box $20_G$ contacts an adjacent box 20. In other approaches, the palletizer 200 limits a kinetic energy of the end-effector 160 and the grasped box $20_G$ such that an amount of energy imparted on placed or existing boxes 20 on a pallet 30 either does not move the placed boxes 20 or is capable of only moving the placed boxes 20 an acceptable distance. This condition may be in case the robot 100 fails to detect contact between the grasped box $20_G$ and another box 20. Here, the acceptable distance may also account for an amount of energy that will be dissipated by friction (e.g., the robot 100 is aware of the box material and/or coefficient of friction between boxes 20).

In some examples, the palletizer 200 is configured to account for previously placed boxes 20 during contact detection as the aligner 220 moves the grasped box $20_G$. By accounting for previously placed boxes 20, the palletizer 200 may potentially increase its contact sensitivity. In other words, the palletizer 200 may take advantage of known proximities between the grasped box $20_G$ and other boxes 20. The palletizer 200 may achieve increased sensitivity by applying a weight to the force experienced by the grasped box $20_G$ (e.g., experienced at the wrist joint $J_{A3}$ about the end-effector 160) and/or to the velocity of the grasped box 20$_G$ based on knowledge the robot 100 has about previously placed boxes 20. For instance, when expecting contact, the palletizer 200 may change the threshold contact force F$_{thresh}$ or the threshold velocity v$_{thresh}$ by a particular weight. In some examples, the particular weight may correspond to a probability distribution representing a contact confidence for the palletizer 200.

In some examples, the palletizer 200 includes a threshold period of time T$_{thresh}$ that the aligner 220 moves the grasped box 20$_G$ in a given direction. Here, this condition may account for the fact that the aligner 220 does not move the grasped box 20$_G$ enough to satisfy the threshold alignment distance 224, but also does not experience the threshold contact force F$_{thresh}$ or the threshold velocity v$_{thresh}$. In this scenario, the aligner 220 is configured to stop moving the grasped box 20$_G$ to minimize potential disruptions between boxes 20. This threshold period of time T$_{thresh}$ may be advantageous when the palletizer 200 experiences some noise at a sensor 172 or otherwise fails to detect contact with another box 20. When this occurs, the threshold period of time T$_{thresh}$ is a set time to minimize issues caused by a lack of detection because the contact will only exist for the threshold period of time T$_{thresh}$.

Figure 3:
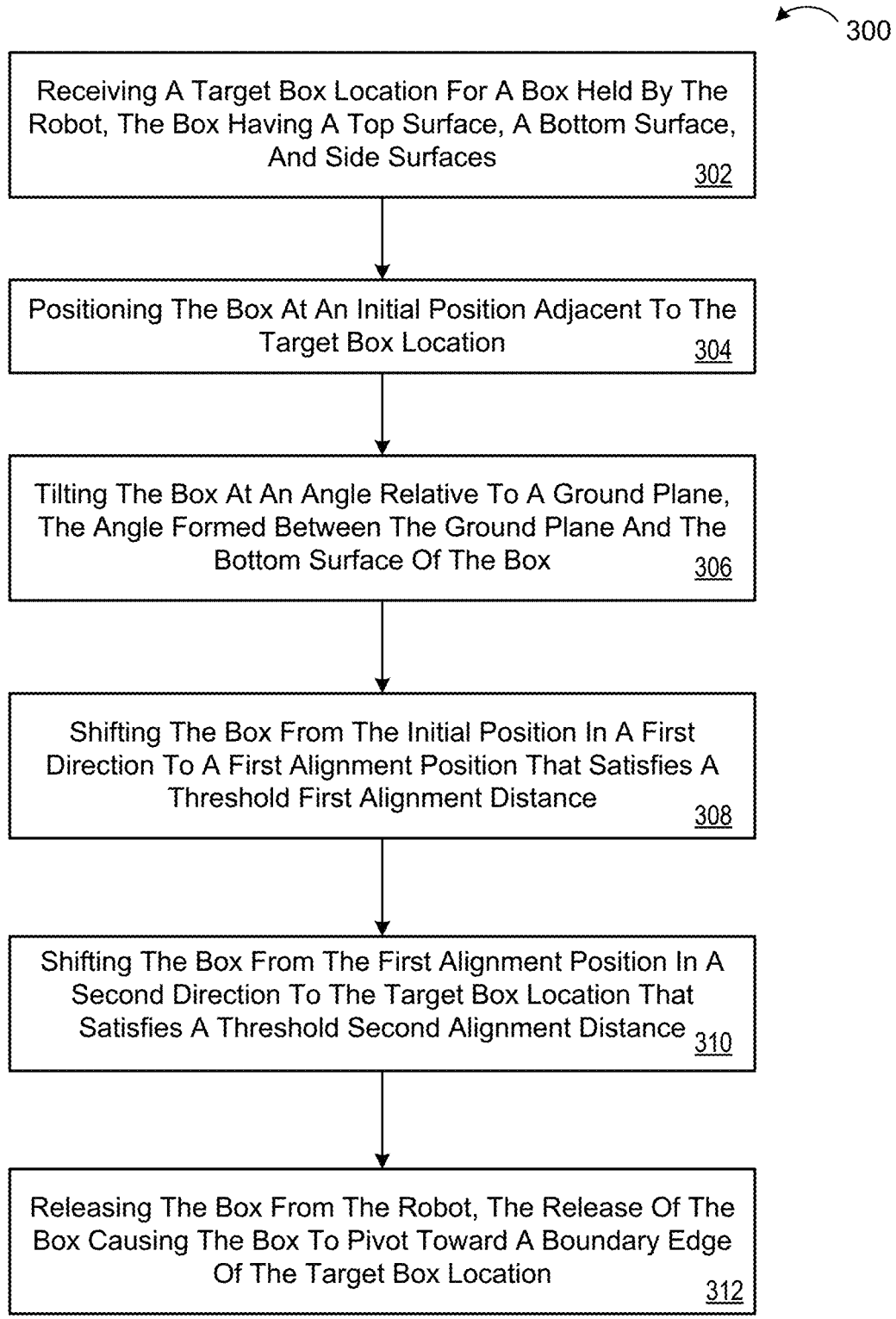
FIG. 3 is an example arrangement of operations for a robot to palletize boxes within an environment.

FIG. 3 is an example of a method 300 for palletizing boxes 20. At operation 302, the method 300 receives a target box location 202 for a box 20$_G$ held by the robot. The box 20$_G$ has a top surface 26T, a bottom surface 26B, and side surfaces 26. At operation 304, the method 300 positions the box 20$_G$ at an initial position 212 adjacent to the target box location 202. At operation 306, the method 300 tilts the box 20$_G$ at an angle relative to a ground plane 12. Here, the angle is formed between the ground plane 12 and the bottom surface 26B of the box 20$_G$. At operation 308, the method 300 shifts the box 20 from the initial position 212 in a first direction D$_1$ to a first alignment position 222$a$ that satisfies a threshold first alignment distance 224$a$. At operation 310, the method 300 shifts the box 20$_G$ from the first alignment position 222$a$ in a second direction D$_2$ to the target box location 202 that satisfies a threshold second alignment distance 224$b$. At operation 312, the method 300 releases the box 20$_G$ from the robot 100. Here the release of the box 20$_G$ causes the box 20$_G$ to pivot toward a boundary edge of the target box location 202.

In some implementations, shifting the box 20$_G$ from the initial position 212 in the first direction D$_1$ to the first alignment position 222$a$ includes, prior to satisfying the first alignment distance 224$a$, determining that the box 20$_G$ experiences a threshold contact force F$_{thresh}$ or a threshold velocity v$_{thresh}$. In these implementations, shifting the box 20$_G$ from the first alignment position 222$a$ in the second direction D$_2$ to the target box location 202 also includes, prior to satisfying the threshold second alignment distance 224$b$, determining that the box 20$_G$ experiences the threshold contact force F$_{thresh}$ or the threshold velocity v$_{thresh}$. In some examples, prior to satisfying the threshold first alignment distance 224$a$ or the threshold second alignment distance 224$b$, the method 300 determines that the box 20$_G$ has moved in the corresponding one of the first direction D$_1$ or the second direction D$_2$ for a threshold period of time T$_{thresh}$.

Figure 4:
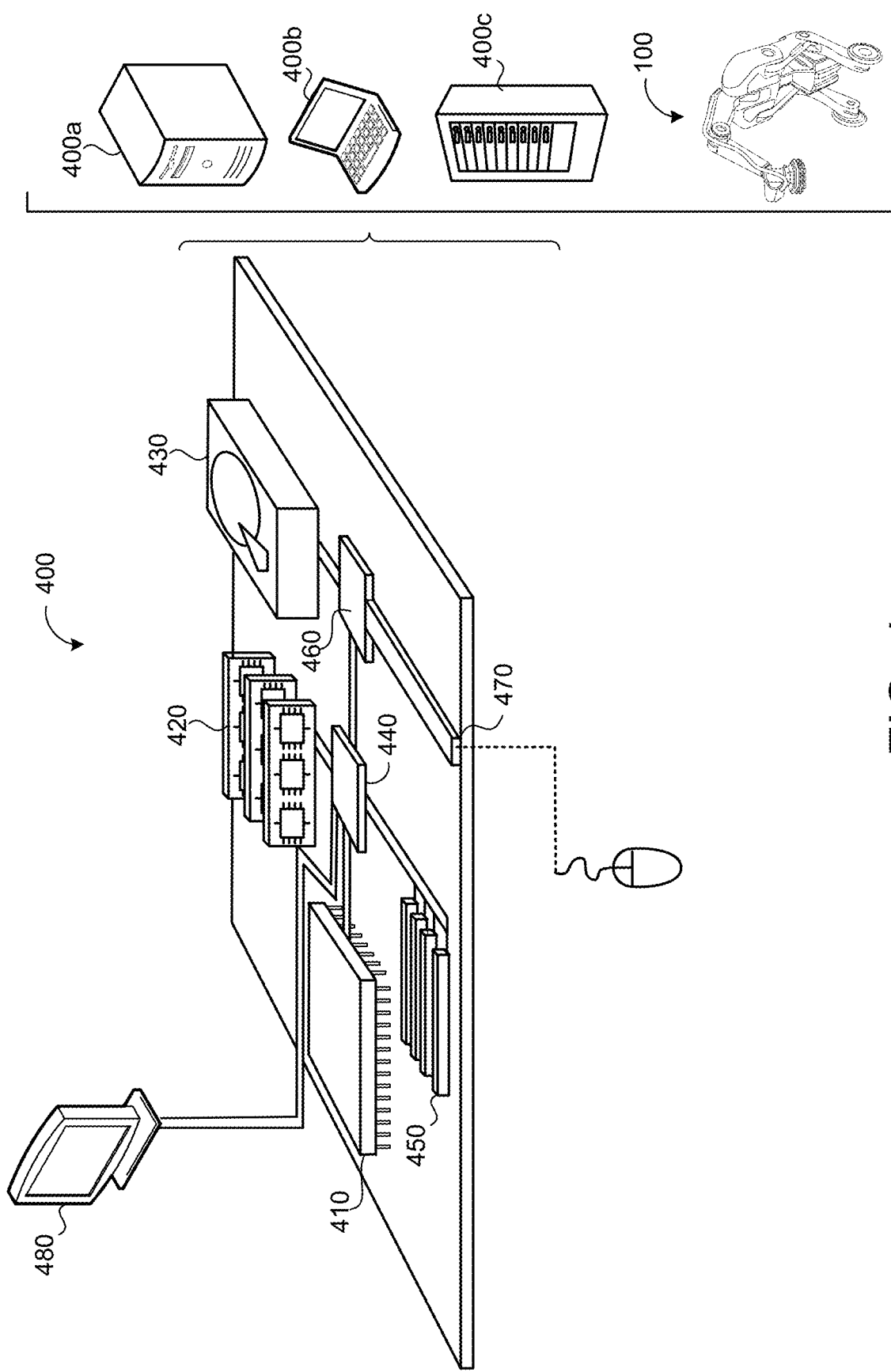
FIG. 4 is a schematic view of an example computing device that may be used to implement the systems and the methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method of placing an object grasped by a mobile robot at a target location, the method comprising:
   receiving, from a sensor system of the mobile robot, sensor data;
   determining based, at least in part on the sensor data, a target object location and an initial position adjacent to the target object location;
   positioning, by the mobile robot, an object grasped by a suction gripper of the mobile robot at the initial position;
   tilting, by the mobile robot, the object at an angle relative to a ground plane;
   shifting, by the mobile robot, the object from the initial position toward an alignment position; and
   releasing, by the mobile robot, the object from the suction gripper of the mobile robot to pivot the object toward the target object location.

2. The method of claim 1, wherein the object is a box.

3. The method of claim 2, wherein positioning the box at the initial position comprises holding the box above the target object location without contacting an adjacent box.

4. The method of claim 2, further comprising releasing the box such that the box abuts against one or more adjacent boxes.

5. The method of claim 2, wherein the target object location is on a pallet that supports a plurality of boxes.

6. The method of claim 1, further comprising determining that the alignment position satisfies a threshold alignment distance based on the sensor data.

7. The method of claim 6, further comprising determining, by the mobile robot, a compensation distance based on the sensor data, the compensation distance compensating for a difference between an actual position of the object and a perceived position of the object by the mobile robot.

8. The method of claim 1, further comprising sensing, by the mobile robot, a contact force on the object greater than a threshold, and halting shifting of the object in response to sensing the contact force greater than the threshold.

9. The method of claim 1, further comprising receiving, by the robot, the target object location.

10. The method of claim 1, wherein determining an initial position adjacent to the target object location comprises:
   determining, based on the sensor data, a first offset in a first direction;
   determining, based on the sensor data, a second offset in a second direction, wherein the second direction is different than the first direction; and
   determining the initial position based, at least in part, on the first offset and the second offset.

11. The method of claim 1, further comprising:
   determining a movement vector from the initial position to the target object position,
   wherein shifting the object from the initial position toward an alignment position comprises shifting the object along the movement vector.

12. A mobile robot comprising:
   a mobile base;
   an arm coupled to the mobile base, the arm comprising a suction-based gripper configured to grasp an object;
   a sensor system comprising one or more sensors configured to sense objects in an environment of the mobile robot;
   data processing hardware; and
   memory hardware in communication with the data processing hardware, the memory hardware storing instructions that when executed on the data processing hardware cause the data processing hardware to perform operations comprising:
      determining based, at least in part, on sensor data received from the sensor system, a target object location and an initial position adjacent to the target object location;
      positioning an object grasped by the suction-based gripper at the initial position;
      tilting the object at an angle relative to a ground plane;
      shifting the object from the initial position toward an alignment position; and
      releasing the object from the suction-based gripper of the mobile robot to pivot the object toward the target object location.

13. The mobile robot of claim 12, wherein the operations further comprise determining that the first alignment position satisfies a threshold alignment distance based on the sensor data.

14. The mobile robot of claim 12, wherein the operations further comprise sensing, by the mobile robot, a contact force on the object greater than a threshold, and halting shifting of the object in response to sensing the contact force greater than the threshold.

15. The mobile robot of claim 12, further comprising:
   an inverted pendulum body having a first end portion, a second end portion, and a plurality of joints, wherein the arm is coupled to the inverted pendulum body at a first joint of the plurality of joints; and
   at least one leg having first and second ends, the first end coupled to the inverted pendulum body at a second joint of the plurality of joints.

16. The mobile robot of claim 15, further comprising a drive wheel rotatably coupled to the second end of the at least one leg and configured to move the mobile robot according to rolling contact with the ground plane, and a counter-balance body disposed on the inverted pendulum body and configured to move relative to the inverted pendulum body.

17. The mobile robot of claim 12, wherein the object is a box, wherein the operations further comprise releasing the box such that the box abuts against one or more adjacent boxes.

18. The mobile robot of claim 17, wherein the target object location is on a pallet that supports a plurality of boxes.

19. The mobile robot of claim 12, wherein determining an initial position adjacent to the target object location comprises:
   determining, based on the sensor data, a first offset in a first direction;
   determining, based on the sensor data, a second offset in a second direction, wherein the second direction is different than the first direction; and
   determining the initial position based, at least in part, on the first offset and the second offset.

20. The mobile robot of claim 12, wherein the operations further comprise:
   determining a movement vector from the initial position to the target object position,
   wherein shifting the object from the initial position toward an alignment position comprises shifting the object along the movement vector.

* * * * *